US011936099B2

(12) United States Patent
Lee et al.

(10) Patent No.: US 11,936,099 B2
(45) Date of Patent: Mar. 19, 2024

(54) ELECTRONIC DEVICE INCLUDING ANTENNA

(71) Applicant: Samsung Electronics Co., Ltd., Suwon-si (KR)

(72) Inventors: Ungryeol Lee, Suwon-si (KR); Heiseong Kwak, Suwon-si (KR); Myeonggeun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/587,842

(22) Filed: Jan. 28, 2022

(65) Prior Publication Data

US 2022/0247070 A1    Aug. 4, 2022

Related U.S. Application Data

(63) Continuation of application No. PCT/KR2022/000746, filed on Jan. 14, 2022.

(30) Foreign Application Priority Data

Jan. 29, 2021 (KR) .................. 10-2021-0013496

(51) Int. Cl.
*H01Q 1/24* (2006.01)
*H01Q 1/52* (2006.01)
(Continued)

(52) U.S. Cl.
CPC ............ *H01Q 1/243* (2013.01); *H01Q 1/523* (2013.01); *H01Q 3/24* (2013.01); *H04B 1/0064* (2013.01); *H04M 1/0214* (2013.01)

(58) Field of Classification Search
CPC .. H01Q 1/243; H01Q 1/521–523; H01Q 3/24; H04B 1/0064
See application file for complete search history.

(56) References Cited

U.S. PATENT DOCUMENTS 7,557,761 B2 * 7/2009 Iwai .................. H01Q 5/321
343/702
8,154,460 B2 * 4/2012 Sakata ................ H01Q 1/243
343/702
(Continued)

FOREIGN PATENT DOCUMENTS

KR         10-0701855 B1     3/2007
KR     10-2020-0031607 A    3/2020
(Continued)

OTHER PUBLICATIONS

International Search Report of the International Searching Authority dated May 9, 2022, in connection with International Application No. PCT/KR2022/000746, 3 pages.

*Primary Examiner* — Hasan Islam

(57) ABSTRACT

An electronic device is provided. The electronic device may include a first housing including a first conductive part and a second conductive part spaced apart from the first conductive part, a second housing including a third conductive part and a fourth conductive part spaced apart from the third conductive part, a connection structure connected to the first housing and the second housing, respectively, a first switch to selectively and electrically connect the first conductive part to the second conductive part, a second switch to selectively and electrically connect the third conductive part to the fourth conductive part, a first connection to electrically connect the first conductive part to the third conductive part in the first state of the electronic device, a second connection to electrically connect the second conductive part to the fourth conductive part in the first state and a wireless communication circuit.

20 Claims, 16 Drawing Sheets

(51) Int. Cl.
*H01Q 3/24* (2006.01)
*H04B 1/00* (2006.01)
*H04M 1/02* (2006.01)

(56) References Cited

U.S. PATENT DOCUMENTS

| | | |
|---|---|---|
| 10,931,323 B2 | 2/2021 | Lee et al. |
| 11,139,554 B2 | 10/2021 | Yoon et al. |
| 11,158,929 B2 | 10/2021 | Shi et al. |
| 2019/0103656 A1 | 4/2019 | Shi et al. |
| 2020/0266524 A1 | 8/2020 | Yoon et al. |
| 2020/0333855 A1 | 10/2020 | Kim et al. |
| 2020/0350939 A1 | 11/2020 | Lee et al. |
| 2021/0143853 A1 | 5/2021 | Lee et al. |
| 2021/0391642 A1 | 12/2021 | Yoon et al. |

FOREIGN PATENT DOCUMENTS

| | | |
|---|---|---|
| KR | 10-2020-0041970 A | 4/2020 |
| KR | 10-2020-0100986 A | 8/2020 |
| KR | 10-2020-0101310 A | 8/2020 |
| KR | 10-2020-0121518 A | 10/2020 |

* cited by examiner

ELECTRONIC DEVICE INCLUDING ANTENNA

CROSS-REFERENCE TO RELATED APPLICATIONS

This application is a continuation of International Application No. PCT/KR2022/000746 designating the United States, filed on Jan. 14, 2022, in the Korean Intellectual Property Receiving Office and claiming priority to Korean Patent Application No. 10-2021-0013496, filed on Jan. 29, 2021, in the Korean Intellectual Property Receiving Office, the disclosures of which are incorporated by reference herein in their entireties.

BACKGROUND

1. Field

The disclosure relates to an electronic device including an antenna.

2. Description of Related Art

A foldable electronic device may include a first housing and a second housing pivotably coupled to the first housing. Each of the first housing and the second housing of the foldable electronic device may include a conductive part (e.g., metal). The conductive part may function as at least a portion of an antenna radiator to transmit and receive a wireless signal having a specific band. In the state that the foldable electronic device is folded, the conductive parts, which function as the antenna radiators, of the first housing and the second housing may be adjacent to each other.

When the conductive part of the first housing and the conductive part of the second housing are adjacent to each other in the state that the foldable electronic device is folded, the correlation between antennas is increased, thereby degrading antenna performance.

In addition, in the state that the foldable electronic device is folded, as the length of a section in which the conductive part of the first housing and the conductive part of the second housing face each other is increased, a coupling factor may be increased, and the isolation between antennas may be degraded. Accordingly, the antenna performance (e.g., sensitivity) may be degraded.

According to embodiments of the disclosure, an electronic device capable of maintaining antenna performance regardless of a folding operation of an electronic device is provided through an antenna structure formed as the conductive part of the first housing that is electrically connected to the conductive part of the second housing in the state that the electronic device is folded.

SUMMARY

According to embodiment of the disclosure, an electronic device may include a first housing including a first side housing peripheral part including a first conductive part and a second conductive part spaced apart from the first conductive part, a second housing including a second side housing peripheral part including a third conductive part and a fourth conductive part spaced apart from the third conductive part, a connection structure connected to the first housing and the second housing such that the first housing and the second housing are mutually folded or unfolded, wherein the electronic device includes a first state in which the first side housing peripheral part and the second side housing peripheral part at least partially contact each other, and a second state, in which the first side housing peripheral part and the second side housing peripheral part are spaced apart from each other, the first conductive part at least partially overlaps the third conductive part in the first state, and the second conductive part at least partially overlaps the fourth conductive part in the first state, a first switch to selectively and electrically connect the first conductive part to the second conductive part, a second switch to selectively and electrically connect the third conductive part to the fourth conductive part, a first connection to electrically connect the first conductive part to the third conductive part in the first state, a second connection to electrically connect the second conductive part to the fourth conductive part, in the first state, and a wireless communication circuit operatively connected to the first switch and the second switch, and electrically connected to a first point of the second conductive part and a second point of the third conductive part, in which the wireless communication circuit is to transmit and receive a wireless communication signal having a specific band by feeding power to the first point or the second point.

According to an embodiment of the disclosure, an electronic device may include a first housing including a first side housing peripheral part, in which the first side housing peripheral part of the first housing includes a first conductive part extending in a first direction, a second conductive part spaced apart from the first conductive part and extending in the first direction, and a first split part interposed between an end of the first conductive part and an end of the second conductive part, a second housing including a second side housing peripheral part, in which the second side housing peripheral part of the second housing includes a third conductive part extending in the first direction, a fourth conductive part spaced apart from the third conductive part and extending in the first direction, and a second split part interposed between an end of the third conductive part and an end of the fourth conductive part, and a connection structure connected to the first housing and the second housing such that the first housing and the second housing are mutually folded or unfolded, wherein the electronic device includes a first state in which the first side housing peripheral part and the second side housing peripheral part at least partially contact each other, and a second state, in which the first side housing peripheral part and the second side housing peripheral part are spaced apart from each other, the first conductive part is spaced apart from the third conductive part while at least partially overlapping the third conductive part in the first state, and the second conductive part is spaced apart from the fourth conductive part while at least partially overlapping the fourth conductive part in the first state, a first switch to selectively and electrically connect the first conductive part to the second conductive part, a second switch to selectively and electrically connect the third conductive part to the fourth conductive part, a first connection to electrically connect the first conductive part to the third conductive part in the first state, a second connection to electrically connect the second conductive part to the fourth conductive part, in the first state, and a wireless communication circuit operatively connected to the first switch and the second switch, and electrically connected to a first point of the second conductive part and a second point of the third conductive part, in which the wireless communication circuit is to transmit and/or receive a wireless communication signal having a specific band by feeding power to the first point and/or the second point.

According to embodiments of the disclosure, the antenna performance may be prevented from being degraded depending on the state of the electronic device.

According to embodiments of the disclosure, the degradation of the antenna performance may be reduced by forming an antenna having a mutual interference section which is reduced, in the state that the electronic device is folded.

Besides, a variety of effects directly or indirectly understood through the disclosure may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, similar components may be assigned with similar reference numerals.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
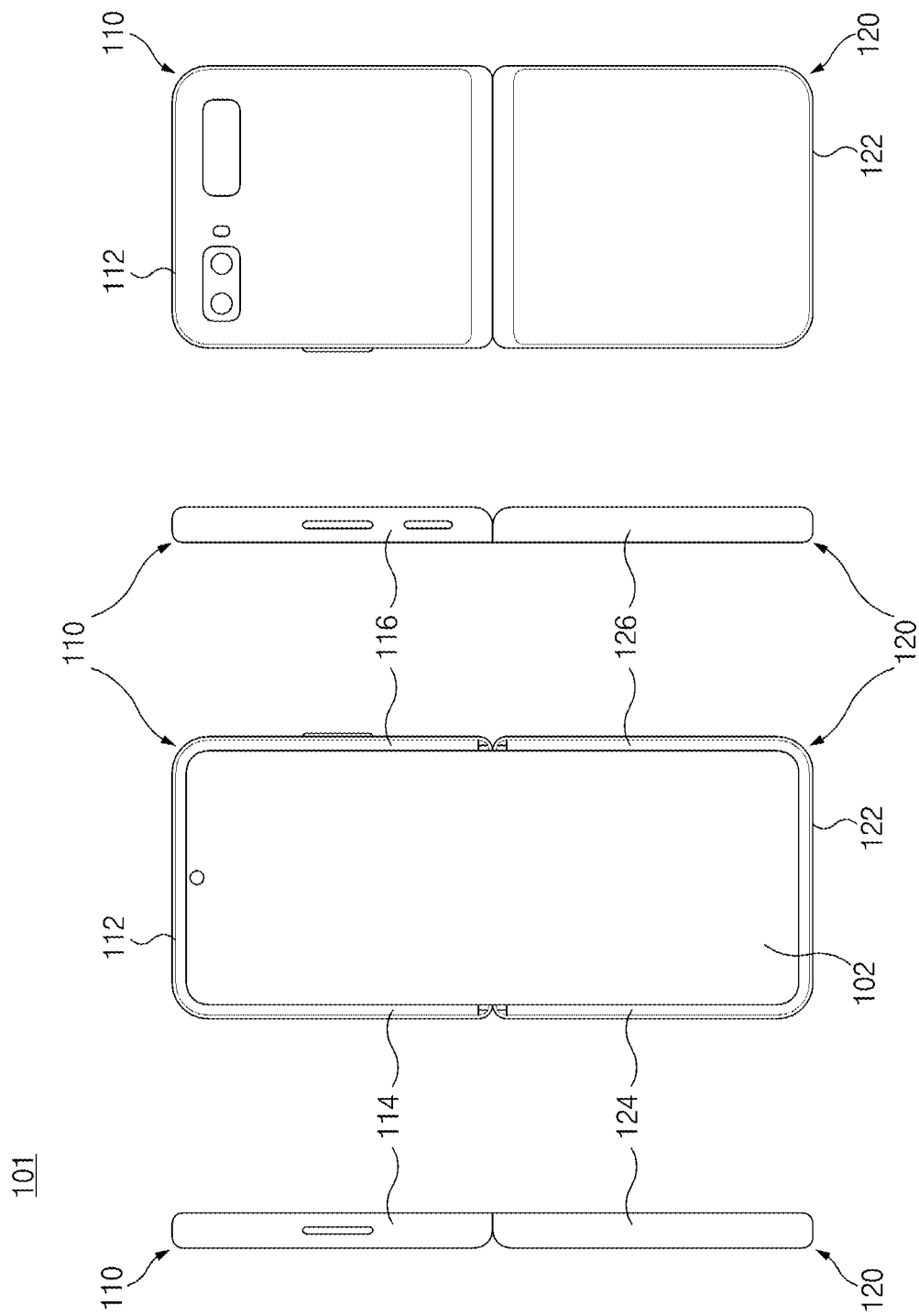
FIG. 1 is a view illustrating an electronic device in an unfolding state, according to an embodiment.

FIG. 1 is a view illustrating an electronic device in an unfolding state, according to an embodiment.

Figure 2A:
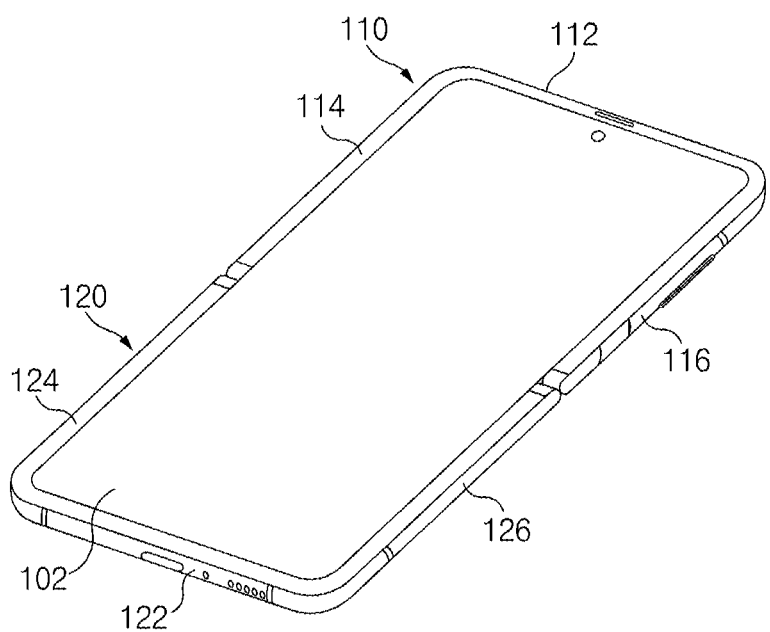
FIG. 2A is a view illustrating an electronic device in an unfolding state, according to an embodiment.

FIG. 2A is a view illustrating an electronic device in an unfolding state, according to an embodiment.

Figure 2B:
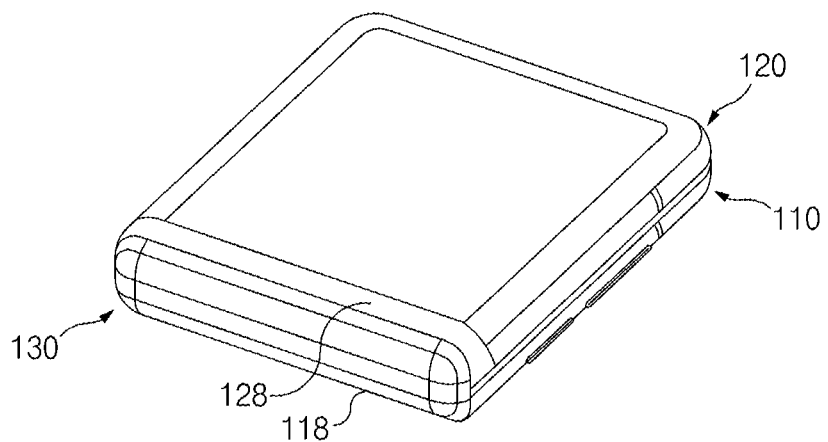
FIG. 2B is a view illustrating an electronic device in a folding state, according to an embodiment.
Figure 2B:
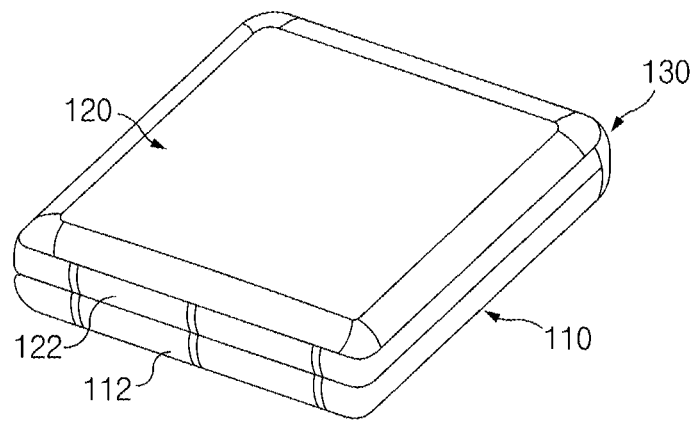

FIG. 2B is a view illustrating an electronic device in a folding state, according to an embodiment.

Referring to FIGS. 1, 2A, and 2B, according to an embodiment, an electronic device 101 may include a first housing 110, a second housing 120, a connection part 130 (see FIG. 2B; a connection structure) and/or a flexible display 102.

According to an embodiment, the electronic device 101 may be a foldable electronic device (e.g., a flexible display device) to be changed to be in an unfolding state (e.g., the electronic device 101 of FIG. 2A) and a folding state (e.g., the electronic device 101 of FIG. 2B). According to an embodiment, the electronic device 101 may include an unfolding state, in which the flexible display 102 is formed in a substantially flat surface, and a folding state in which a partial area of the flexible display 102 is formed in a curved shape. According to an embodiment, the electronic device 101 may include an intermediate state between the unfolding state and the folding state. For example, the intermediate state may include a state changed from the unfolding state to the folding state, or a state changed from the folding state to the unfolding state.

According to an embodiment, the electronic device 101 may include the first housing 110 and the second housing 120, which serve as foldable housings.

According to an embodiment, the first housing 110 and the second housing 120 may be disposed while interposing the connection part 130 between the first housing 110 and the second housing 120. According to an embodiment, the first housing 110 and the second housing 120 may be connected to each other through the connection part 130. According to an embodiment, the first housing 110 and the second housing 120 may be coupled to the connection part 130 such that the first housing 110 and the second housing 120 are rotatable about each other. According to an embodiment, each of the first housing 110 and the second housing 120 may rotate about the connection part 130. As the first housing 110 and/or the second housing 120 rotates, the electronic device 101 may be folded or unfolded. According to an embodiment, the connection part 130 may include a hinge structure to provide a rotating angle to the first housing 110 and the second housing 120.

According to an embodiment, the angle or the distance between the first housing 110 and the second housing 120 may be varied depending on whether the state of the electronic device 101 is the unfolding state, the folding state, or the intermediate state.

According to an embodiment, the connection part 130 may be changed in an extent exposed to the outside of the electronic device 101, depending on the operating state (the unfolding state or the folding state) of the electronic device 101. For example, referring to FIG. 1, when the electronic device 101 is in the unfolding state, the connection part may be covered by portions of the first housing 110 and the second housing 120 such that the connection part may not be substantially viewed. For another example, referring to FIG. 2B, when the electronic device 101 is in the folding state, the connection part 130 may be at least partially exposed to the outside of the first housing 110 and the second housing 120.

According to an embodiment, the first housing 110 and the second housing 120 may have substantially symmetrical shapes compared to each other about the connection part 130, but the disclosure is not limited thereto.

According to an embodiment, the first housing 110 may include a first peripheral part 112 (or a first side housing, a first side part), and the second housing 120 may include a second peripheral part 122 (or a second side housing, a second side part). According to an embodiment, the first peripheral part 112 of the first housing 110 may be positioned at an upper portion of the electronic device 101 when the electronic device 101 is in the unfolding state, and the second peripheral part 122 of the second housing 120 may be positioned at a lower portion of the electronic device 101, when the electronic device 101 is in the unfolding state. According to an embodiment, the first peripheral part 112 and the second peripheral part 122 may at least partially overlap each other, when the electronic device 101 is in the folding state. According to an embodiment, the first peripheral part 112 and the second peripheral part 122 may at least partially contact each other, when the electronic device 101 is in the folding state.

According to an embodiment, a state in which the first peripheral part 112 and the second peripheral part 122 at least partially contact each other, which is similar to the folding state of the electronic device 101, may be referred to as a first state of the electronic device 101.

According to an embodiment, a state in which the first peripheral part 112 and the second peripheral part 122 are spaced apart from each other (do not make contact with each other), which is similar to the unfolding state or the intermediate state of the electronic device 101, may be referred to as a second state of the electronic device 101.

According to an embodiment, the first housing 110 may include a third peripheral part 114 extending from an end of the first peripheral part 112 to the connection part 130, a fourth peripheral part 116 extending from an opposite end of the first peripheral part 112 to the connection part 130, and/or a fifth peripheral part 118 extending from the third peripheral part 114 to the fourth peripheral part 116 and coupled to the connection part 130.

According to an embodiment, the second housing 120 may include a sixth peripheral part 124 extending from an end of the second peripheral part 122 to the connection part 130, a seventh peripheral part 126 extending from an opposite end of the second peripheral part 122 to the connection part 130, and/or an eighth peripheral part 128 extending from the sixth peripheral part 124 to the seventh peripheral part 126 and coupled to the connection part 130.

According to an embodiment, the first housing 110 and the second housing 120 may at least partially include conductive parts. For example, the first peripheral part 112 of the first housing 110 may include a first conductive part (e.g., a first conductive part 12 of FIG. 3A) and a second conductive part (e.g., a second conductive part 14 of FIG. 3A). For another example, the second peripheral part 122 of the second housing 120 may include a third conductive part (e.g., a third conductive part 16 of FIG. 3A) and a fourth conductive part (e.g., a fourth conductive part 18 of FIG. 3A). According to an embodiment, the first to fourth conductive parts may be formed of metal having conductivity, and may serve as an antenna radiator fed with power from a wireless communication circuit (e.g., a wireless communication module 992 of FIG. 9) to transmit and/or receive a wireless signal having a specific band. According to an embodiment, the first conductive part (e.g., the first conductive part 12 of FIG. 3A) and the second conductive part (e.g., the second conductive part 14 of FIG. 3A) may be positioned at the third peripheral part 114 or the fourth peripheral part 116, respectively. According to an embodiment, the third conductive part (e.g., the third conductive part 16 of FIG. 3A) and the fourth conductive part (e.g., the fourth conductive part 18 of FIG. 3A) may be positioned at the sixth peripheral part 124 or the seventh peripheral part 126, respectively. For example, when the first conductive part and the second conductive part are positioned at the third peripheral part 114, the third conductive part and the fourth conductive part may be positioned at the sixth peripheral part 124. For another example, when the first conductive part and the second conductive part are positioned at the fourth peripheral part 116, the third conductive part and the fourth conductive part may be positioned at the seventh peripheral part 126.

According to an embodiment, the first housing 110 and the second housing 120 may provide a space in which various parts of the electronic device 101 are disposed. For example, a printed circuit board, the sensor module (e.g., a sensor module 976 of FIG. 9) and/or the battery (e.g., a battery 989 of FIG. 9) may be disposed in the inner space of the first housing 110 and/or the second housing 120. According to an embodiment, at least one (e.g., a processor 920 and/or a communication module 990) of components illustrated in FIG. 9 may be disposed on the printed circuit board.

According to an embodiment, the flexible display 102 may be at least partially disposed in the first housing 110 and the second housing 120. According to an embodiment, the first housing 110 and the second housing 120 may be formed to have specific stiffness to support the flexible display 102.

According to an embodiment, the flexible display 102 may be bent to correspond to the folding operation of the electronic device 101. For example, at least a portion of the flexible display 102 may be bent or spread to correspond to the angle between the first housing 110 and the second housing 120.

According to an embodiment, the flexible display 102 may include a panel layer including a plurality of pixels arranged in a matrix form to display a screen, and an external protective layer disposed on the panel layer. The external protective layer may be, for example, formed in a polymer structure (e.g., polyimide) and/or glass. The external protective layer may be substantially transparent such that light emitted from the panel layer is viewed by a user. For another example, the flexible display 102 may further include a touch panel layer.

Figure 3A:
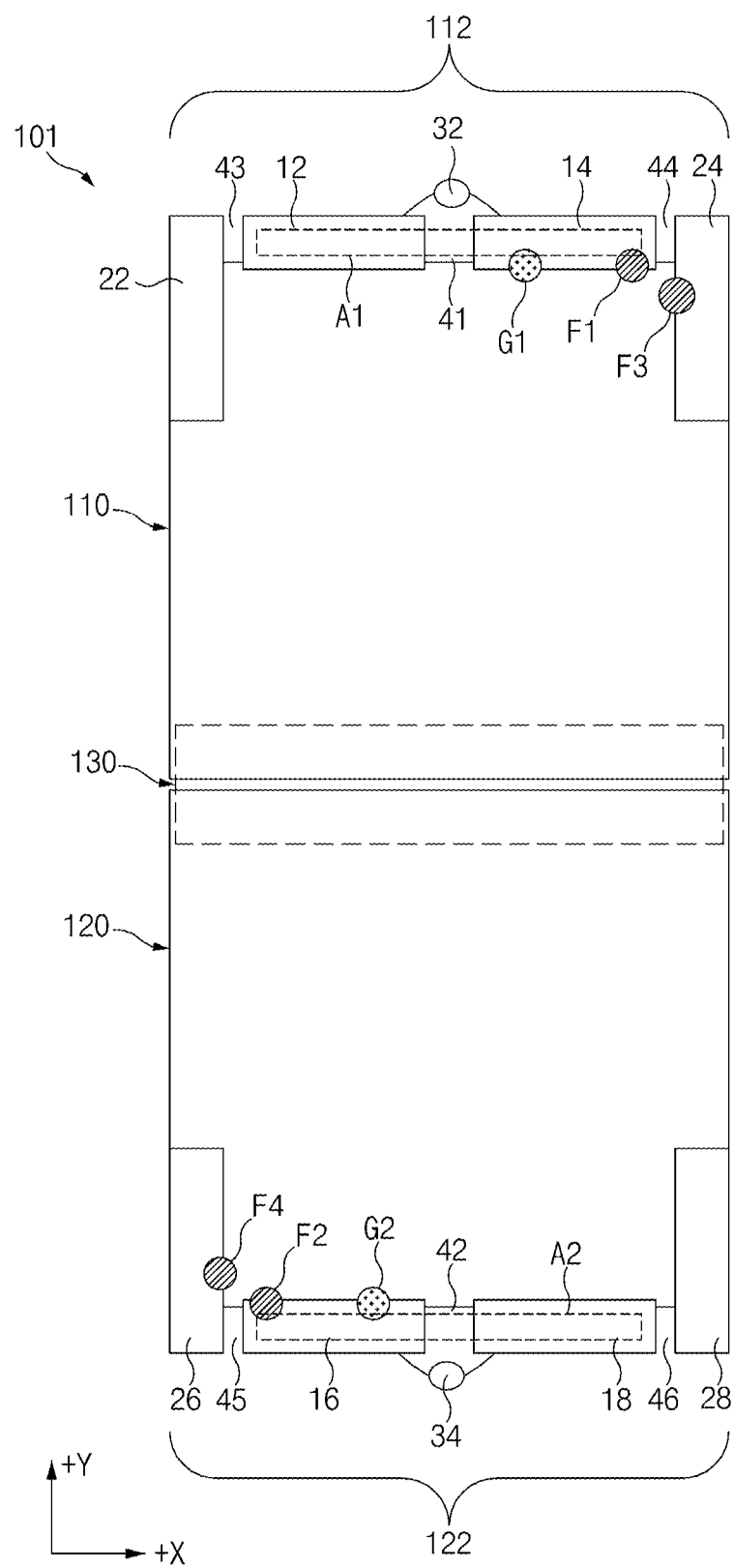
FIG. 3A illustrates an electronic device in an unfolding state, according to an embodiment.

FIG. 3A illustrates an electronic device in an unfolding state, according to an embodiment.

Figure 3B:
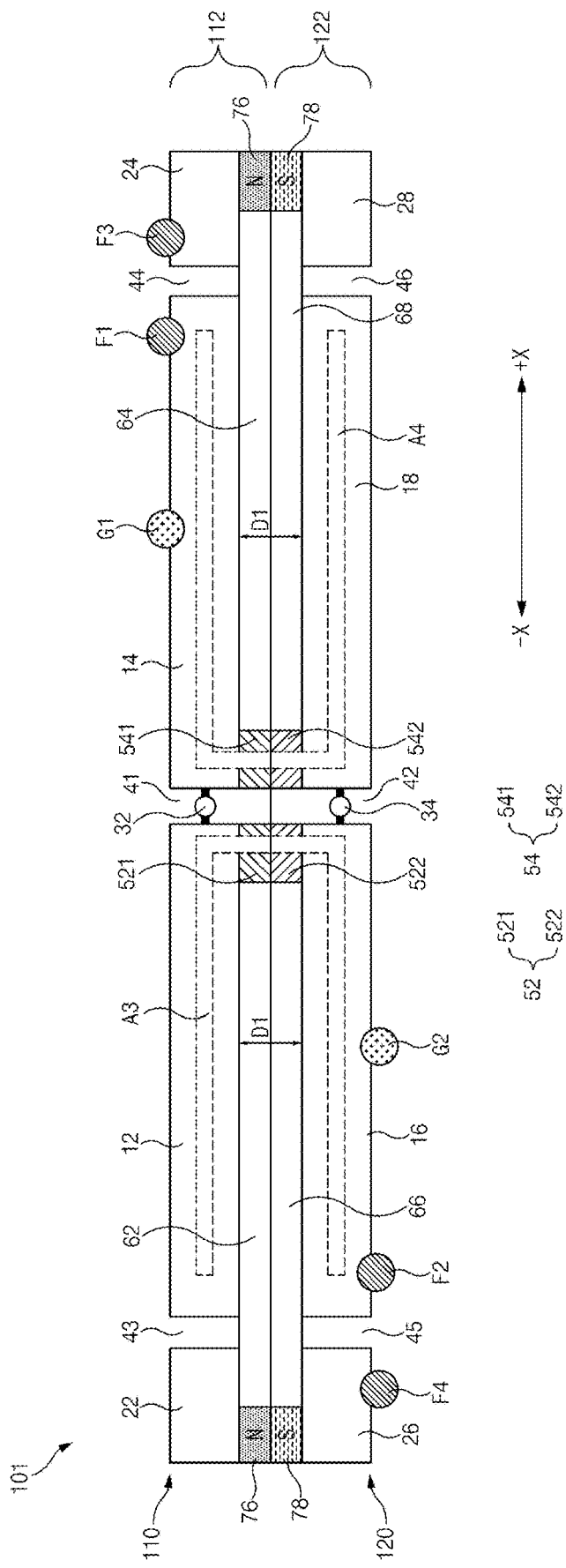
FIG. 3B illustrates a first side housing peripheral part and a second side housing peripheral part in an electronic device in a folding state, according to an embodiment.

FIG. 3B illustrates a first peripheral part and a second peripheral part in an electronic device in a folding state, according to an embodiment.

According to an embodiment, the electronic device 101 may include the first state and the second state. The first state may be a state in which the first peripheral part 112 of the first housing 110 at least partially contacts the second peripheral part 122 of the second housing 120, as illustrated in FIGS. 2B and 3B. The second state may be a state in which the first peripheral part 112 of the first housing 110 is spaced apart from each other or does not physically contact the second peripheral part 122 of the second housing 120, as illustrated in FIGS. 2A and 3A. However, the second state of the electronic device 101 is not limited to the state in which the electronic device 101 is fully unfolded as illustrated in FIGS. 2A and 3A.

Referring to FIG. 3A, according to an embodiment, the first housing 110 of the electronic device 101 may include the first conductive part 12, the second conductive part 14, and a first switch 32 disposed at the first peripheral part 112.

According to an embodiment, the first conductive part 12 may extend in a first direction. For example, the first conductive part 12 may extend along the first peripheral part 112. For example, the first conductive part 12 may extend in an X-axis direction. For another example, the first conductive part 12 may extend in a direction (e.g., the X-axis direction) substantially parallel to the connection part 130. For example, the first direction may be the X-axis direction.

According to an embodiment, the second conductive part 14 may be spaced apart from the first conductive part 12 to extend in a first direction. According to an embodiment, the second conductive part 14 may have the substantially same length as that of the first conductive part 12, but the disclosure is not limited thereto.

According to an embodiment, a first gap 41 may be formed between the first conductive part 12 and the second conductive part 14. According to an embodiment, the first gap 41 may be formed between an end of the first conductive part 12 and an end of the second conductive part 14. According to an embodiment, the first conductive part 12 and the second conductive part 14 are at least partially physically spaced apart from each other by the first gap 41.

According to an embodiment, the first switch 32 may be disposed between the first conductive part 12 and the second conductive part 14. According to an embodiment, the first switch 32 may be configured such that the first conductive part 12 and the second conductive part 14 are selectively and electrically connected to each other. The first switch 32 may include, for example, a switch circuit. The first switch 32 may include a single pole single through (SPST) switch, but the disclosure is not limited thereto. According to an embodiment, the first switch 32 may be electrically connected to a processor (e.g., the processor 920 of FIG. 9) or a wireless communication circuit (e.g., the wireless communication module 992 of FIG. 9) of the electronic device 101 and may be controlled by the processor or the wireless communication circuit.

According to an embodiment, the second conductive part 14 may be electrically connected to the wireless communication circuit at a first power feeding point F1. For another example, the second conductive part 14 may be electrically connected to at least one grounding part (e.g., a grounding flat surface provided on the printed circuit board of the electronic device 101 or a metal mechanism of the electronic device 101) of the electronic device 101, at a first grounding point G1.

According to an embodiment, the first power feeding point F1 may be closer to an opposite end of the second conductive part 14 (e.g., an end position of the second conductive part 14 away from the first gap 41), rather than an end of the second conductive part 14 (e.g., an end portion of the second conductive part 14 close to the first gap 41).

According to an embodiment, the first grounding point G1 may be interposed between the an end of the second conductive part 14 and the first power feeding point F1. However, the position of the first power feeding point F1 or the first grounding point G1 is not limited to the above description, but may be varied depending on the required resonance frequency or operating frequency.

According to an embodiment, an aperture tuner including various passive components may be interposed between the first grounding point G1 and the at least one grounding part to shift a resonance frequency by adjusting the electrical length of an antenna (e.g., a first antenna A1 and/or a fourth antenna A4).

According to an embodiment, the second housing 120 of the electronic device 101 may include the third conductive part 16, the fourth conductive part 18, and a second switch 34 disposed at the second peripheral part 122.

According to an embodiment, the third conductive part 16 may extend in the first direction. According to an embodiment, the third conductive part 16 may be substantially parallel to the first conductive part 12.

According to an embodiment, the fourth conductive part 18 may be spaced apart from the third conductive part 16 to extend in the first direction. According to an embodiment, the fourth conductive part 18 may have the substantially same length as that of the third conductive part 16, but the disclosure is not limited thereto.

According to an embodiment, a second gap 42 may be formed between the third conductive part 16 and the fourth conductive part 18. According to an embodiment, the second gap 42 may be formed between an end of the third conductive part 16 and an end of the fourth conductive part 18. According to an embodiment, the third conductive part 16 and the fourth conductive part 18 are at least partially physically spaced apart from each other by the second gap 42.

According to an embodiment, the second switch 34 may be disposed between the third conductive part 16 and the fourth conductive part 18. According to an embodiment, the second switch 34 may be configured such that the third conductive part 16 and the fourth conductive part 18 are selectively and electrically connected to each other. The second switch 34 may include, for example, a switch circuit. The second switch 34 may include an SPST switch, but the disclosure is not limited thereto. According to an embodiment, the second switch 34 may be electrically connected to the processor or the wireless communication circuit of the electronic device 101, and then, may be controlled by the processor or the wireless communication circuit.

According to an embodiment, the third conductive part 16 may be electrically connected to the wireless communication circuit at a second power feeding point F2. For another example, the third conductive part 16 may be electrically connected to the at least one grounding part of the electronic device 101 at a second grounding point G2.

According to an embodiment, the second power feeding point F2 may be closer to an opposite end of the third conductive part 16 (e.g., an end portion of the third conductive part 16 away from the second gap 42), rather than an end of the third conductive part 16 (e.g., an end portion of the third conductive part 16 close to the second gap 42).

According to an embodiment, the second grounding point G2 may be interposed between the the an end of the third conductive part 16 and the second power feeding point F2. However, the position of the second power feeding point F2 or the second grounding point G2 is not limited to the above description, but may be varied depending on the required resonance frequency or operating frequency.

According to an embodiment, an aperture tuner including various passive components may be interposed between the second grounding point G2 and the at least one grounding part to shift a resonance frequency by adjusting the electrical length of an antenna (e.g., a second antenna A2 and/or a third antenna A3).

According to an embodiment, the first housing 110 may include a fifth conductive part 22 and/or a sixth conductive part 24.

According to an embodiment, the fifth conductive part 22 may extend in the second direction different from the first direction. According to an embodiment, the fifth conductive part 22 may extend from an end of the first peripheral part 112 to the connection part 130. According to an embodiment, the fifth conductive part 22 may be spaced apart from the first conductive part 12 while interposing a third gap 43 between the fifth conductive part 22 and the first conductive part 12. According to an embodiment, at least a portion of the third peripheral part 114 of the first housing 110 may be formed by the fifth conductive part 22. According to an embodiment, the fifth conductive part 22 may function as an antenna radiator which is fed with power from the wireless communication circuit to transmit and/or receive a wireless communication signal.

According to an embodiment, the sixth conductive part 24 may extend in a direction (e.g., the second direction) substantially parallel to the fifth conductive part 22. According to an embodiment, the sixth conductive part 24 may extend from the opposite end of the first peripheral part 112 to the connection part 130. According to an embodiment, the sixth conductive part 24 may be spaced apart from the second conductive part 14 while interposing a fourth gap 44 between the sixth conductive part 24 and the second conductive part 14. According to an embodiment, at least a portion of the fourth peripheral part 116 (see FIG. 1) of the first housing 110 may be formed by the sixth conductive part 24. According to an embodiment, the sixth conductive part 24 may function as an antenna radiator which is fed with power from the wireless communication circuit at a third power feeding point F3 to transmit and/or receive a wireless communication signal.

According to an embodiment, the second housing 120 may include a seventh conductive part 26 and/or an eighth conductive part 28.

According to an embodiment, the seventh conductive part 26 may extend in the second direction different from the first direction. According to an embodiment, the seventh conductive part 26 may extend from an end of the second peripheral part 122 to the connection part 130. According to an embodiment, the seventh conductive part 26 may be spaced apart from the third conductive part 16 while interposing a fifth gap 45 between the seventh conductive part 26 and the third conductive part 16. According to an embodiment, at least a portion of the sixth peripheral part 124 (see FIG. 1) of the second housing 120 may be formed by the seventh conductive part 26. According to an embodiment, the seventh conductive part 26 may function as an antenna radiator which is fed with power from the wireless communication circuit at a fourth power feeding point F4 to transmit and/or receive a wireless communication signal.

According to an embodiment, the eighth conductive part 28 may extend in a direction (e.g., the second direction) substantially parallel to the seventh conductive part 26. According to an embodiment, the eighth conductive part 28 may extend from the opposite end of the second peripheral part 122 to the connection part 130. According to an embodiment, the eighth conductive part 28 may be spaced apart from the fourth conductive part 18 while interposing a sixth gap 46 between the eighth conductive part 28 and the fourth conductive part 18. According to an embodiment, at least a portion of the seventh peripheral part 126 (see FIG. 1) of the second housing 120 may be formed by the eighth conductive part 28. According to an embodiment, the eighth conductive part 28 may function as an antenna radiator which is fed with power from the wireless communication circuit to transmit and/or receive a wireless communication signal.

According to an embodiment, the first conductive part 12, the second conductive part 14, the third conductive part 16, the fourth conductive part 18, the fifth conductive part 22, the sixth conductive part 24, the seventh conductive part 26, and/or the eighth conductive part 28 may include a conductive material (e.g., a metal).

According to an embodiment, a non-conductive material (e.g., air) may be filled in or a non-conductive member (e.g., resin) may be at least partially disposed in at least one of the first gap 41, the second gap 42, the third gap 43, the fourth gap 44, the fifth gap 45, and/or the sixth gap 46. According to an embodiment, the first gap 41, the second gap 42, the third gap 43, the fourth gap 44, the fifth gap 45, and the sixth gap 46 may be referred to as a first split part 41, a second split part 42, a third split part 43, a fourth split part 44, a fifth split part 45, and a sixth split part 46, in that the first gap 41, the second gap 42, the third gap 43, the fourth gap 44, the fifth gap 45, and the sixth gap 46 at least partially physically split conductive parts included in peripheral parts of the housing.

Referring to FIG. 3B, according to an embodiment, the first peripheral part 112 and the second peripheral part 122 may at least partially contact each other in the first state of the electronic device 101. According to an embodiment, the first peripheral part 112 and the second peripheral part 122 may at least partially overlap each other in the first state. According to an embodiment, the first peripheral part 112 and the second peripheral part 122 may at least partially overlap each other in a direction substantially perpendicular to the X axis illustrated in FIG. 3B.

According to an embodiment, the first conductive part 12 and the third conductive part 16 may at least partially overlap each other in the first state. According to an embodiment, the second conductive part 14 may at least partially overlap the fourth conductive part 18, in the first state. According to an embodiment, the first gap 41 and the second gap 42 may at least partially overlap each other in the first state.

According to an embodiment, a first connection member 52 (or a first connection, a first connection part) may be interposed between the first conductive part 12 and the third conductive part 16. According to an embodiment, the first connection member 52 may be interposed between an end, which is adjacent to the first gap 41, of the first conductive part 12, and an end, which is adjacent to the second gap 42, of the third conductive part 16.

According to an embodiment, the first connection member 52 may be configured such that the first conductive part 12 and the third conductive part 16 are electrically connected to each other, when the electronic device 101 is in the first state.

For example, the first connection member 52 may include a first conductive magnet member 521 (or a first conductive magnet) and a second conductive magnet member 522 (or a second conductive magnet) arranged such that opposite poles face each other in the first state. The first conductive magnet member 521 may be disposed at the first peripheral part 112 to be electrically connected to the first conductive part 12, and the second conductive magnet member 522 may be disposed at the second peripheral part 122 to be electrically connected to the third conductive part 16. In the first state, the first conductive magnet member 521 and the second conductive magnet member 522 may physically contact each other, and the first conductive part 12 and the third conductive part 16 may be electrically connected to each other through the first conductive magnet member 521 and the second conductive magnet member 522. In the second state, as the first conductive magnet member 521 and the second conductive magnet member 522 are physically spaced apart from each other, the first conductive part 12 and the third conductive part 16 may be electrically isolated from each other. The first conductive magnet member 521 and the second conductive magnet member 522 may include, for example, a neodymium magnet. According to an embodiment, at least one of the first conductive magnet member 521 and the second conductive magnet 522 may be omitted. For example, when the first conductive magnet 521 is omitted, a conductive member may be disposed at a position of the first conductive magnet 521.

For another example, the first connection 52 described as being referred to as the first conductive magnet 521 and the second conductive magnet 522 may alternatively include locking structures (e.g., the coupling structures in a snap-fit manner) coupled to each other or separated from each other in the first state or the second state. The locking structure may include, for example, a locking part disposed at the first side housing peripheral part 112 and electrically connected to the first conductive part 12 and a receiving part disposed at the second side housing peripheral part 122 and electrically connected to the third conductive part 16. The locking part may be disposed at substantially the same position as the position of the first conductive magnet 521, and the receiving part may be disposed at substantially the same position as the position of the second conductive magnet 522. The locking part and the receiving part may be formed of a conductive material (e.g., metal). In the first state, the locking part and the receiving part may be mechanically fastened to each other, and the first conductive part 12 and the third conductive part 16 may be electrically connected to each other through the locking part and the receiving part. In the second state, the first conductive part 12 and the third conductive part 16 may be electrically spaced apart from each other by separating the locking part and the receiving part from each other. According to an embodiment, the locking part and/or the receiving part may have elasticity having specific intensity to facilitate coupling-separation according to the folding state of the electronic device 101.

The configuration of the first connection 52 to electrically connect the first conductive part 12 to the third conductive part 16 depending on the folding state of the electronic device 101 is not limited to the above example, but may employ various manners that may be employed through those skilled in the art. For example, the first conductive magnet 521 of the first connection 52 may be substituted with a connection such as a pogo pin or a C-clip. The second conductive magnet 522 may be substituted with a conductive member contacting the pogo pin or the C-clip.

Although the above example has been described while focusing on direct coupling (DC coupling) in which a current fed to the third conductive part 16 directly flows through a conductive line formed by the first connection 52, the disclosure is not limited thereto. The first connection 52 may employ an AC coupling manner such that an AC current fed to the third conductive part 16 is smoothly transmitted to the first conductive part 12 in the first state.

According to an embodiment, a second connection member 54 (or a second connection, a second connection part) may be interposed between the second conductive part 14 and the fourth conductive part 18. According to an embodiment, the second connection member 54 may be interposed between an end, which is adjacent to the first gap 41, of the second conductive part 14, and an end, which is adjacent to the second gap 42, of the fourth conductive part 18.

According to an embodiment, the second connection member 54 may be configured such that the second conductive part 14 and the fourth conductive part 18 are electrically connected to each other, when the electronic device 101 is in the first state. The structure and the function of the second connection member 54, which electrically connects the second conductive part 14 to the fourth conductive part 18 in the first state may correspond to the description on the first connection member 52. For example, the second connection member 54 may include a third conductive magnet member 541 (or a third conductive magnet) corresponding to the first conductive magnet member 521 and a fourth conductive magnet member 542 (or a fourth conductive magnet) corresponding to the second conductive magnet member 522.

According to an embodiment, the electronic device 101 may include a first magnet member 76 (or a first magnet) and/or a second magnet member 78 (or a second magnet). According to an embodiment, the first magnet member 76 may be disposed at the first peripheral part 112, and the second magnet member 78 may be disposed at the second peripheral part 122. According to an embodiment, in the first state, the first magnet member 76 and the second magnet member 78 may at least partially overlap each other, and opposite poles of the first magnet member 76 and the second magnet member 78 may face each other. The first magnet member 76 and the second magnet member 78 may be attracted to each other in the first state, such that the first peripheral part 112 and the second peripheral part 122 are at least partially maintained to be in contact with each other. According to an embodiment, one of the first magnet member 76 and/or the second magnet member 78 may be omitted. For example, when the first magnet member 76 is omitted, a component including a material, such as iron, which is attracted to the second magnet member 78, may be disposed at a position of the first magnet member 76.

According to an embodiment, the first housing 110 may include a first non-conductive part 62 and/or a second non-conductive part 64 disposed at the first peripheral part 112. According to an embodiment, the first non-conductive part 62 may be disposed on the first conductive part 12. According to an embodiment, the first non-conductive part 62 may extend in a first direction along the first conductive part 12. According to an embodiment, the second non-conductive part 64 may be disposed on the second conductive part 14. According to an embodiment, the second non-conductive part 64 may extend in the first direction along the second conductive part 14. Although FIG. 3B illustrates that the first non-conductive part 62 is spaced apart from the second non-conductive part 64, the first non-conductive part 62 and the second non-conductive part 64 may be integrally formed in another embodiment. According to another embodiment, when the first gap 41, the third gap 43, and the fourth gap 44 include non-conductive members, the non-conductive members may be integrally formed with the first non-conductive part 62 and the second non-conductive part 64.

According to an embodiment, the second housing 120 may include a third non-conductive part 66 and/or a fourth non-conductive part 68 disposed at the second peripheral part 122. According to an embodiment, the third non-conductive part 66 may be substantially parallel to the third conductive part 16. For another example, the fourth non-conductive part 68 may be disposed on the fourth conductive part 18. According to an embodiment, the third non-conductive part 66 may extend in the first direction along the third conductive part 16. For another example, the fourth non-conductive part 68 may extend in the first direction along the fourth conductive part 18. Although FIG. 3B illustrates that the third non-conductive part 66 is spaced apart from the fourth non-conductive part 68, the third non-conductive part 66 and the fourth non-conductive part 68 may be integrally formed. According to another embodiment, when non-conductive members are disposed in the second gap 42, the fifth gap 45, and the sixth gap 46, the non-conductive members may be integrally formed with the third non-conductive part 66 and the fourth non-conductive part 68.

According to an embodiment, in the first state, the first non-conductive part 62 and/or the third non-conductive part 66 may be interposed between the first conductive part 12 and the third conductive part 16. According to an embodiment, the first non-conductive part 62 and the third non-conductive part 66 may at least partially contact each other in the first state. According to an embodiment, the first non-conductive part 62 and the third non-conductive part 66 may at least partially overlap each other in the first state.

According to an embodiment, in the first state, the first conductive part 12 and the third conductive part 16 may be spaced apart from each other by a specified distance D1 corresponding to the thicknesses of the first non-conductive part 62 and the third non-conductive part 66.

According to an embodiment, at least one of the first non-conductive part 62 or the third non-conductive part 66 may be omitted. For example, when the first non-conductive part 62 is omitted, the thicknesses of the third non-conductive part 66 may be formed to be the distance D1.

According to an embodiment, in the first state, the second non-conductive part 64 and/or the fourth non-conductive part 68 may be interposed between the second conductive part 14 and the fourth conductive part 18. According to an embodiment, the second non-conductive part 64 and the fourth non-conductive part 68 may at least partially contact each other in the first state. According to an embodiment, the second non-conductive part 64 and the fourth non-conductive part 68 may at least partially overlap each other in the first state. According to an embodiment, the second conductive part 14 may be spaced apart from the fourth conductive part 18 by the specific distance D1, in the first state.

According to an embodiment, at least one of the second non-conductive part 64 or the fourth non-conductive part 68 may be omitted. For example, when the second non-conductive part 64 is omitted, the thicknesses of the fourth non-conductive part 68 may be formed to be the distance D1.

According to an embodiment, the first non-conductive part 62, the second non-conductive part 64, the third non-conductive part 66, and/or the fourth non-conductive part 68 may include a non-conductive material (e.g., resin).

Hereinafter, the antenna structure will be described depending on the state (e.g., the first state or the second state) of the electronic device 101.

Referring to FIG. 3A, in the second state, the electronic device 101 according to an embodiment may include the first antenna A1 including the first conductive part 12 and the second conductive part 14, and the second antenna A2 including the third conductive part 16 and the fourth conductive part 18.

According to an embodiment, the first conductive part 12 and the second conductive part 14 may be electrically connected to each other through the first switch 32 in the second state. According to an embodiment, the second conductive part 14 may be fed with power from the wireless communication circuit at the first power feeding point F1 and may be electrically connected to at least one ground part of the electronic device 101 at the first grounding point G1. According to an embodiment, the first conductive part 12 and the second conductive part 14 electrically connected to each other may serve as a radiator of the first antenna A1 in the second state. According to an embodiment, the first antenna A1 may transmit and/or receive a wireless signal having a specified band. The specific band may be, for example, the band of about 1.4 GHz to 2.2 GHz, but the disclosure is not limited thereto.

According to an embodiment, the third conductive part 16 and the fourth conductive part 18 may be electrically connected to each other through the second switch 34 in the second state. According to an embodiment, the third conductive part 16 may be fed with power from the wireless communication circuit at the second power feeding point F2 and may be electrically connected to at least one ground part of the electronic device 101 at the second grounding point G2. According to an embodiment, the third conductive part 16 and the fourth conductive part 18 electrically connected to each other may function as the radiator of the second antenna A2 in the second state. According to an embodiment, the second antenna A2 may transmit and/or receive the wireless signal having the specified band.

According to an embodiment, in the second state, the first conductive part 12 may be electrically isolated from the third conductive part 16, and the second conductive part 14 may be electrically isolated from the fourth conductive part 18.

According to an embodiment, the wireless communication circuit may control the first switch 32 and/or the second switch 34, such that the first switch 32 and/or the second switch 34 is turned on in the second state. According to an embodiment, as the first switch 32 is turned on, the first conductive part 12 and the second conductive part 14 are electrically connected to each other. According to another embodiment, as the second switch 34 is turned on, the third conductive part 16 and the fourth conductive part 18 are electrically connected to each other. According to an embodiment, the wireless communication circuit may transmit and/or receive a wireless signal having a specific band by using the first antenna A1 and/or the second antenna A2 in the second state.

Referring to FIG. 3B, according to an embodiment, the electronic device 101 may include the third antenna A3 including the first conductive part 12, the third conductive part 16, and the first connection member 52 in the first state, and/or the fourth antenna A4 including the second conductive part 14, the fourth conductive part 18, and the second connection member 54.

According to an embodiment, the first switch 32 may be turned off, to electrically isolate the first conductive part 12 from the second conductive part 14 in the first state. According to an embodiment, the second switch 34 may be turned off, to electrically isolate the third conductive part 16 from the fourth conductive part 18 in the first state.

According to an embodiment, the first conductive part 12 and the third conductive part 16 may be electrically connected to each other through the first connection member 52 in the first state. According to an embodiment, in the first state, the third conductive part 16 may be fed with power from the wireless communication circuit at the second power feeding point F2 and may be electrically connected to at least one ground part of the electronic device 101 at the second grounding point G2. According to an embodiment, the third conductive part 16, the first connection member 52, and the first conductive part 12 electrically connected to each other may function as the radiator of the third antenna A3 in the first state. According to an embodiment, the third antenna A3 may transmit and/or receive the wireless signal having the specified band. According to an embodiment, the electrical length defining the resonance frequency of the third antenna A3 may be substantially the same as those of the first antenna A1 and/or the second antenna A2.

According to an embodiment, the second conductive part 14 and the fourth conductive part 18 may be electrically connected to each other through the second connection member 54 in the first state. According to an embodiment, in the first state, the second conductive part 14 may be fed with power from the wireless communication circuit at the first power feeding point F1 and may be electrically connected to at least one ground part of the electronic device 101 at the first grounding point G1. According to an embodiment, the second conductive part 14, the second connection member 54, and the fourth conductive part 18 electrically connected to each other may function as the radiator of the fourth antenna A4 in the first state. According to an embodiment, the fourth antenna A4 may transmit and/or receive the wireless signal having the specified band.

According to an embodiment, the wireless communication circuit may control the first switch 32 and/or the second switch 34 to turn off the first switch 32 and/or the second switch 34 in the first state. According to an embodiment, as the first switch 32 is turned off, the first conductive part 12 may be electrically isolated from the second conductive part 14. As the second switch 34 is turned off, the third conductive part 16 may be electrically isolated from the fourth conductive part 18. According to an embodiment, the wireless communication circuit may transmit and/or receive a wireless signal having a specific band by using the third antenna A3 and/or the fourth antenna A4 in the first state. According to an embodiment, the electrical length defining the resonance frequency of the fourth antenna A4 may be substantially the same as those of the first antenna A1 and/or the second antenna A2.

According to an embodiment described above, an electronic device (e.g., the electronic device 101 of FIG. 1) may include a first housing (e.g., the first housing 110) including a first peripheral part (e.g., the first peripheral part 112 of FIG. 3A) including a first conductive part (e.g., the first conductive part 12 of FIG. 3A) and a second conductive part (e.g., the second conductive part 14 of FIG. 3A) spaced apart from the first conductive part, a second housing (e.g., the second housing 120 of FIG. 3A) including a second peripheral part (e.g., the second peripheral part 122 of FIG. 3A) including a third conductive part (e.g., the third conductive part 16 of FIG. 3A) and a fourth conductive part (e.g., the fourth conductive part 18) spaced apart from the third conductive part, a connection structure (e.g., the connection part 130 of FIG. 3A) connected to the first housing and the second housing such that the first housing and the second housing are mutually folded or unfolded, in which the electronic device includes a first state (e.g., the first state of the electronic device 101 illustrated in FIG. 3B) in which the first peripheral part and the second peripheral part at least partially contact each other, and a second state (e.g., the second state of the electronic device 101 illustrated in FIG. 3A), in which the first peripheral part and the second peripheral part are spaced apart from each other, the first conductive part at least partially overlaps the third conductive part in the first state, and the second conductive part at least partially overlaps the fourth conductive part in the first state, a first switch (e.g., the first switch 32 of FIG. 3A) to selective electrically connect the first conductive part to the second conductive part, a second switch (e.g., the second switch 34 of FIG. 3A) to selective electrically connect the third conductive part to the fourth conductive part, a first connection member (e.g., the first connection member 52 of FIG. 3B) to electrically connect the first conductive part to the third conductive part in the first state, a second connection member (e.g., the second connection member 54 of FIG. 3B) to electrically connect the second conductive part to the fourth conductive part, in the first state, and a wireless communication circuit (e.g., the wireless communication module 992) operatively connected to the first switch and the second switch, and electrically connected to a first point (e.g., the first power feeding point F1 of FIG. 3A) of the second conductive part and a second point (e.g., the second power feeding point F2 of FIG. 3A) of the third conductive part. The wireless communication circuit is to transmit and/or receive a wireless communication signal having a specific band by feeding power to the first point and/or the second point.

According to an embodiment, the wireless communication circuit may, in the first state, control the first switch to electrically isolate the first conductive part from the second conductive part, and control the second switch to electrically isolate the third conductive part from the fourth conductive part.

According to an embodiment, the wireless communication circuit may: in the second state, control the first switch to electrically connect the first conductive part to the second conductive part, and control the second switch to electrically connect the third conductive part to the fourth conductive part.

According to an embodiment, in the first state, the first conductive part and the third conductive part may be spaced apart from each other by a specific distance (e.g., the specified distance D1 of FIG. 3B), and the second conductive part and the fourth conductive part may be spaced apart from each other by the specific distance.

According to an embodiment, the first housing may include a first split part (e.g., the first gap 41 of FIG. 3A) interposed between an end of the first conductive part and an end of the second conductive part, in the first peripheral part, and a second split part (e.g., the second gap 42 of FIG. 3A) interposed between an end of the third conductive part and an end of the fourth conductive part, in the first peripheral part. The first conductive part and the second conductive part may be spaced apart from each other while interposing the first split part between the first conductive part and the second conductive part, and the second conductive part and the fourth conductive part may be spaced apart from each other while interposing the second split part between the second conductive part and the fourth conductive part.

According to an embodiment, the first gap 41 and the second gap 42 may at least partially overlap each other, in the first state.

According to an embodiment, the first housing may include a fifth conductive part (e.g., the fifth conductive part 22 of FIG. 3A) extending toward the connection structure from an end of the first peripheral part, in which the fifth conductive part is electrically connected to the wireless communication circuit at a third point, a sixth conductive part (e.g., the sixth conductive part 24 of FIG. 3A) extending toward the connection structure from an opposite end of the first peripheral part, in which the sixth conductive part is electrically connected to the wireless communication circuit at a fourth point (e.g., the third power feeding point F3 of FIG. 3A), a third split part (e.g., the third gap 43 of FIG. 3A) interposed between an opposite end of the first conductive part and the five conductive part, and a fourth split part (e.g., the fourth gap 44 of FIG. 3A) interposed between an opposite end of the second conductive part and the sixth conductive part.

According to an embodiment, the second housing may include a seventh conductive part (e.g., the seventh conductive part 26 of FIG. 3A) extending toward the connection structure from an end of the second peripheral part, in which the seventh conductive part is electrically connected to the wireless communication circuit at a fifth point (e.g., the fourth power feeding point F4 of FIG. 3A), an eight conductive part (e.g., the eighth conductive part 28) extending toward the connection structure from an opposite end of the second peripheral part, in which the eighth conductive part is electrically connected to the wireless communication circuit at a sixth point, a fifth split part (e.g., the fifth gap 45 of FIG. 3A) interposed between an opposite end of the third conductive part and the seventh conductive part, and a sixth split part (e.g., the sixth gap 46 of FIG. 3A) interposed between an opposite end of the fourth conductive part and the eighth conductive part.

According to an embodiment, the first point may be closer to an opposite end of the second conductive part, rather than the end of the second conductive part, and the second point may be closer to an opposite end of the third conductive part, rather than the end of the third conductive part.

According to an embodiment, the first connection member may be interposed between the end of the first conductive part and the end of the third conductive part, in the first state, and the second connection member may be interposed between the end of the second conductive part and the end of the fourth conductive part, in the first state.

According to an embodiment, the first connection member may include a first conductive magnet member (e.g., the first conductive magnet member 521 of FIG. 3B) positioned at the first peripheral part and electrically connected to the first conductive part, and a second conductive magnet member (e.g., the second conductive magnet member 522 of FIG. 3B) positioned at the second peripheral part, and electrically connected to the third conductive part. The first conductive magnet member and the second conductive magnet member may contact each other such that mutually opposite poles face each other in the first state. The second connection member may include a third conductive magnet member (e.g., the third conductive magnet member 541) positioned at the first peripheral part and electrically connected to the second conductive part, and a fourth conductive magnet member (e.g., the fourth conductive magnet member 542 of FIG. B) positioned at the second peripheral part and electrically connected to the fourth conductive part. The third conductive magnet member and the fourth conductive magnet member may contact each other such that mutually opposite poles face each other in the first state.

According to an embodiment, the second conductive part is electrically connected to at least one grounding part of the electronic device at a first grounding point (e.g., the first grounding point G1 of FIG. 3A), and the third conductive part may be electrically connected to the at least one grounding part at a second grounding point (e.g., the second grounding point G2 of FIG. 3A).

According to an embodiment, the first grounding point may be interposed between the first point and the end of the second conductive part, and the second grounding point may be interposed between the second point and the end of the third conductive part.

According to an embodiment, the first conductive part, the second conductive part, the third conductive part, and the fourth conductive part may be substantially parallel to the connection structure.

According to an embodiment, the first peripheral part may include a first non-conductive part (e.g., the first non-conductive part 62 of FIG. 3B) disposed on the first conductive part and a second non-conductive part (e.g., the second non-conductive part 64 of FIG. 3B) disposed on the second conductive part, and the second peripheral part may include a third non-conductive part (e.g., the third non-conductive part 66 of FIG. 3B) disposed on the third conductive part and a fourth non-conductive part (e.g., the fourth non-conductive part 68 of FIG. 3B) disposed on the fourth conductive part. In the first state, the first non-conductive part and the third non-conductive part may partially contact each other, the second non-conductive part and the fourth non-conductive part may partially contact each other, and the first conductive part and the third conductive part may be spaced apart from each other while interposing the first non-conductive part and the third non-conductive part between the first conductive part and the third conductive part, and the second conductive part and the fourth conductive part may be spaced apart from each other while interposing the second non-conductive part and the fourth non-conductive part between the second conductive part and the fourth conductive part.

According to an embodiment described above, an electronic device (e.g., the electronic device 101 of FIG. 1) may include a first housing (e.g., the first housing 110 of FIG. 3A) including a first peripheral part (e.g., the first peripheral part 112 of FIG. 3A), in which the first peripheral part of the first housing includes a first conductive part extending in a first direction (e.g., the X axis direction of FIG. 3A), a second conductive part (e.g., the second conductive part 14 of FIG. 3A) spaced apart from the first conductive part and extending in the first direction, and a first split part (e.g., the first gap 41 of FIG. 3A) interposed between an end of the first conductive part and an end of the second conductive part, a second housing (e.g., the second housing 120 of FIG. 3A) including a second peripheral part (e.g., the second peripheral part 122 of FIG. 3A), in which the second peripheral part of the second housing may include a third conductive part (e.g., the third conductive part 16 of FIG. 3A) extending in the first direction, a fourth conductive part (e.g., the fourth conductive part 18 of FIG. 3A) spaced apart from the third conductive part and extending in the first direction, and a second split part (e.g., the second gap 42 of FIG. 3A) interposed between an end of the third conductive part and an end of the fourth conductive part, and a connection structure (e.g., the connection part 130 of FIG. 3A) connected to the first housing and the second housing such that the first housing and the second housing are mutually folded or unfolded. The electronic device may include a first state (e.g., the first state of the electronic device 101 of FIG. 3B) in which the first peripheral part and the second peripheral part at least partially contact each other, and a second state (e.g., the second state of the electronic device 101 of FIG. 3A), in which the first peripheral part and the second peripheral part are spaced apart from each other, the first conductive part is spaced apart from the third conductive part while at least partially overlapping the third conductive part in the first state, and the second conductive part is spaced apart from the fourth conductive part while at least partially overlapping the fourth conductive part in the first state, a first switch (e.g., the first switch 32 of FIG. 3A) to selective electrically connect the first conductive part to the second conductive part, a second switch (the second switch 34 of FIG. 3A) to selective electrically connect the third conductive part to the fourth conductive part, a first connection member (e.g., the first connection member 52) to electrically connect the first conductive part to the third conductive part in the first state, a second connection member (e.g., the second connection member 54 of FIG. 3B) to electrically connect the second conductive part to the fourth conductive part, in the first state, and a wireless communication circuit (e.g., the wireless communication module 992 of FIG. 9) operatively connected to the first switch and the second switch, and electrically connected to a first point (e.g., the first power feeding point F1 of FIG. 3b) of the second conductive part and a second point (e.g., the second power feeding point F2) of the third conductive part. The wireless communication circuit may transmit and/or receive a wireless communication signal having a specific band by feeding power to the first point and/or the second point.

According to an embodiment, the wireless communication circuit may, in the first state, control the first switch to electrically isolate the first conductive part from the second conductive part, and control the second switch to electrically isolate the third conductive part from the fourth conductive part. The wireless communication circuit may, in the second state, control the first switch to electrically connect the first conductive part to the second conductive part, and control the second switch to electrically connect the third conductive part to the fourth conductive part.

According to an embodiment, the second conductive part is electrically connected to at least one grounding part of the electronic device at a first grounding point (e.g., the first grounding point G1 of FIG. 3B), and the third conductive part may be electrically connected to the at least one grounding part at a second grounding point (e.g., the second grounding point G2 of FIG. 3B).

According to an embodiment, the first grounding point may be interposed between the first point and the end of the second conductive part, and the second grounding point may be interposed between the second point and the end of the third conductive part.

According to an embodiment, the first point may be closer to an opposite end of the second conductive part, rather than the end of the second conductive part, and the second point may be closer to the opposite end of the third conductive part, rather than the end of the third conductive part.

Figure 4A:
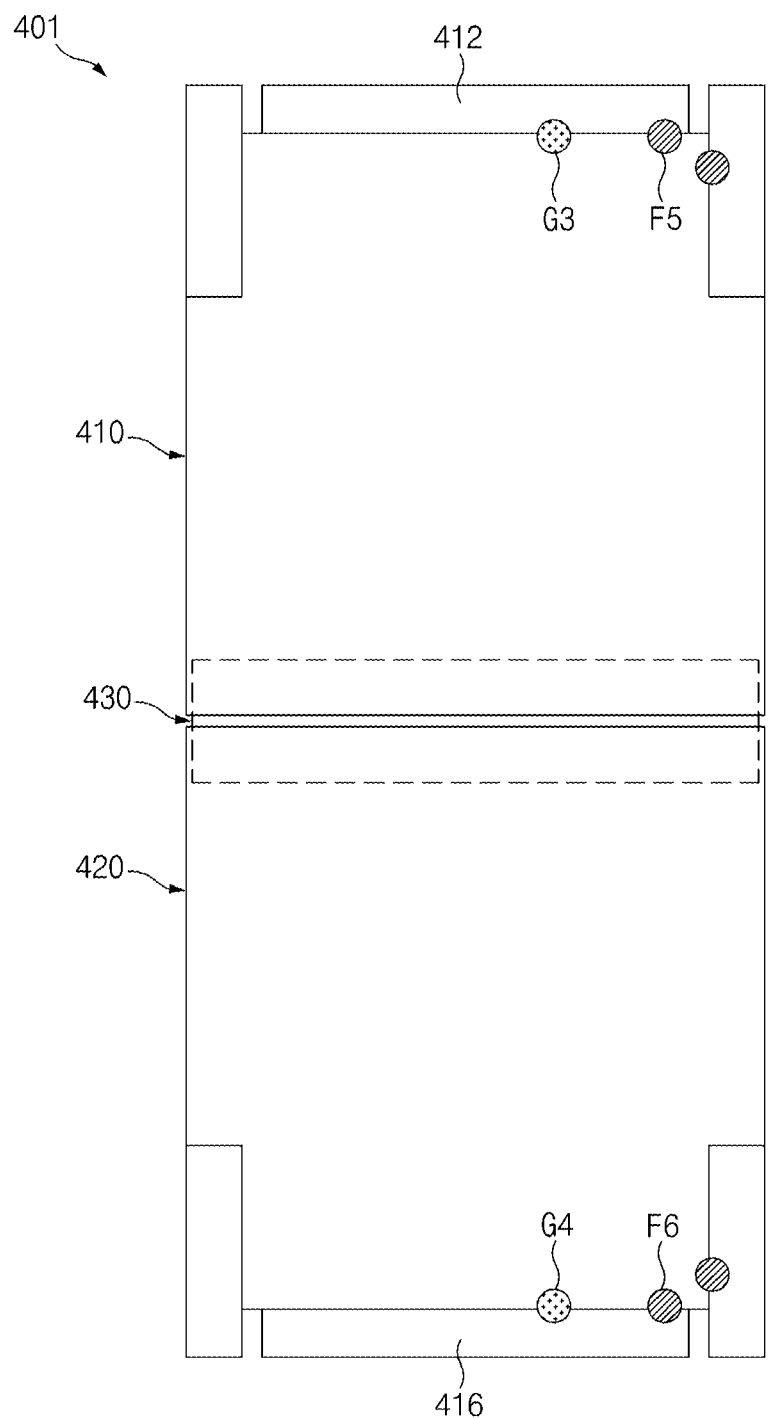
FIG. 4A illustrates an electronic device in an unfolding state (second state), according to a comparative example.

FIG. 4A illustrates an electronic device in an unfolding state (second state), according to a comparative example.

Figure 4B:
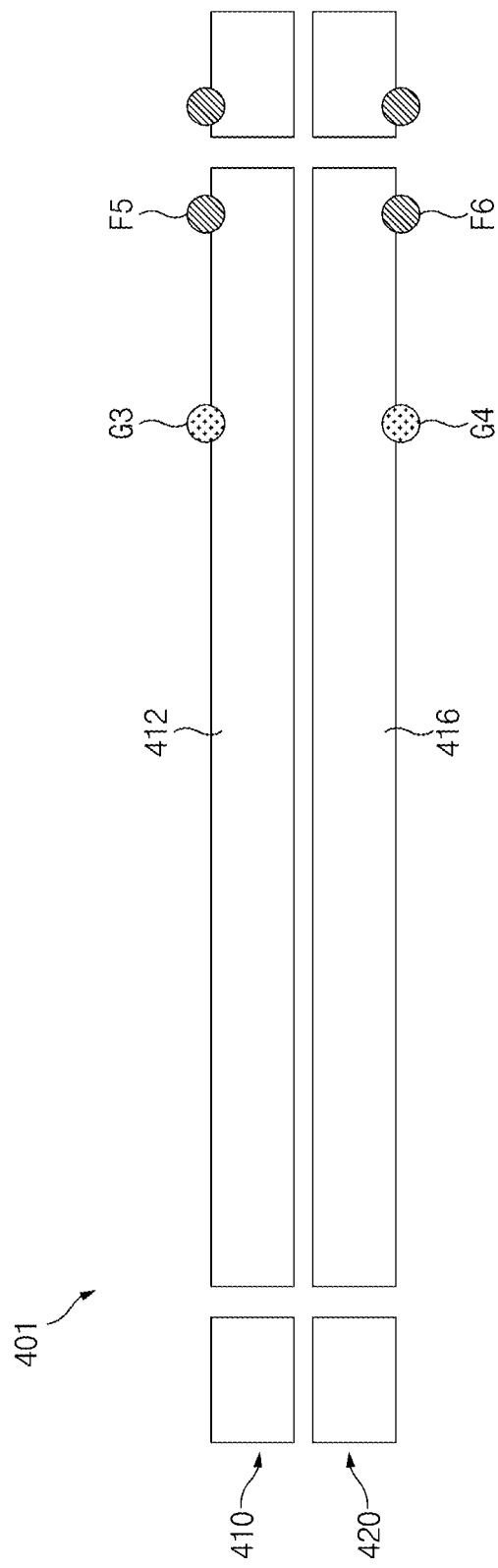
FIG. 4B illustrates an electronic device in a folding state (first state), according to a comparative example.

FIG. 4B illustrates an electronic device in a folding state (first state), according to a comparative example.

Figure 5:
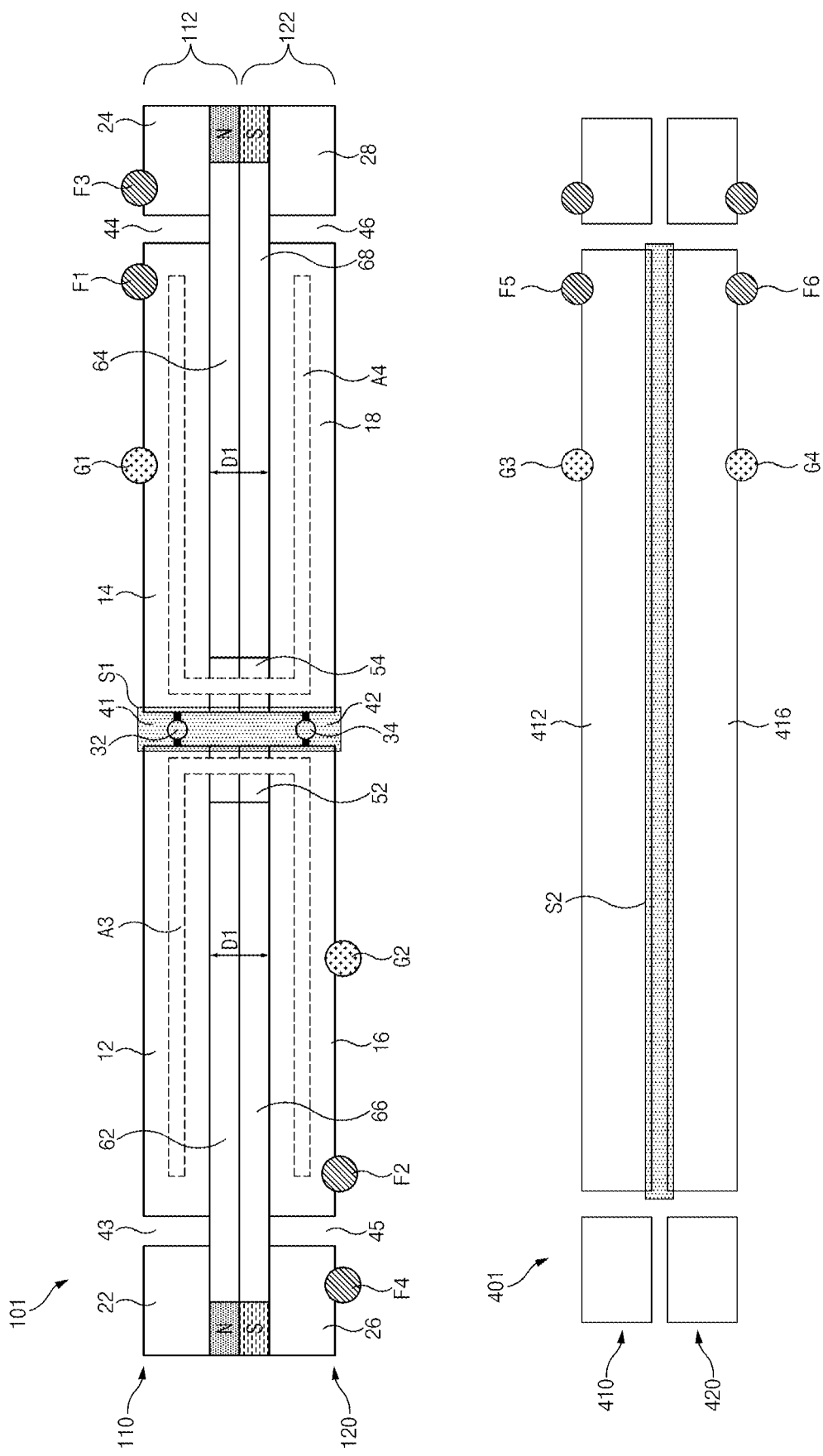
FIG. 5 is a view illustrating an electronic device according to an embodiment and an electronic device according to a comparative example.

FIG. 5 is a view illustrating an electronic device according to an embodiment and an electronic device according to a comparative example.

Referring to FIGS. 4A and 4B, according to the comparative example, an electronic device 401 may include a first housing 410, a second housing 420, and a connection part 430.

According to a comparative example, the first housing 410 of the electronic device 401 may include a first conductive part 412. According to the comparative example, the first conductive part 412 is not split, which is different from the first conductive part 12 and the second conductive part 14 of the electronic device 101 according to an embodiment.

According to a comparative example, the second housing 420 of the electronic device 401 may include a second conductive part 416. According to the comparative example, the second conductive part 416 is not split, which is different from the third conductive part 16 and the fourth conductive part 18 of the electronic device 101 according to an embodiment.

According to the comparative example, a fifth power feeding point F5 and a third grounding point G3 may be formed in the first conductive part 412. According to the comparative example, a sixth power feeding point F6 and a fourth grounding point G4 may be formed in the second conductive part 416. According to the comparative example, in the first state, the fifth power feeding point F5 may overlap the sixth power feeding point F6, and the third grounding point G3 may overlap the fourth grounding point G4.

According to the comparative example, the first conductive part 412 and the second conductive part 416 of the electronic device 401 may function as antenna radiators to transmit and/or receive the wireless signal having a specific band.

Referring to FIG. 5, according to an embodiment, the third antenna A3 may face the fourth antenna A4, which is adjacent to the third antenna A3, by a first section S1, in the first state of the electronic device 101. According to the comparative example, in the first state of the electronic device 401, the first conductive part 412 may face the second conductive part 416, which is adjacent to the first conductive part 412, by a second section S2 having an area (or length) size greater than that of the first section S1. The first section S1 and the second section S2 may act as coupling factors that degrade the antenna performance. According to an embodiment, an electronic device may prevent the antenna performance from degrading due to the coupling factor by reducing the area size (or length) of a section in which antennas (or conductive parts), which are mutually adjacent to each other, face each other in the first state.

Figure 6A:
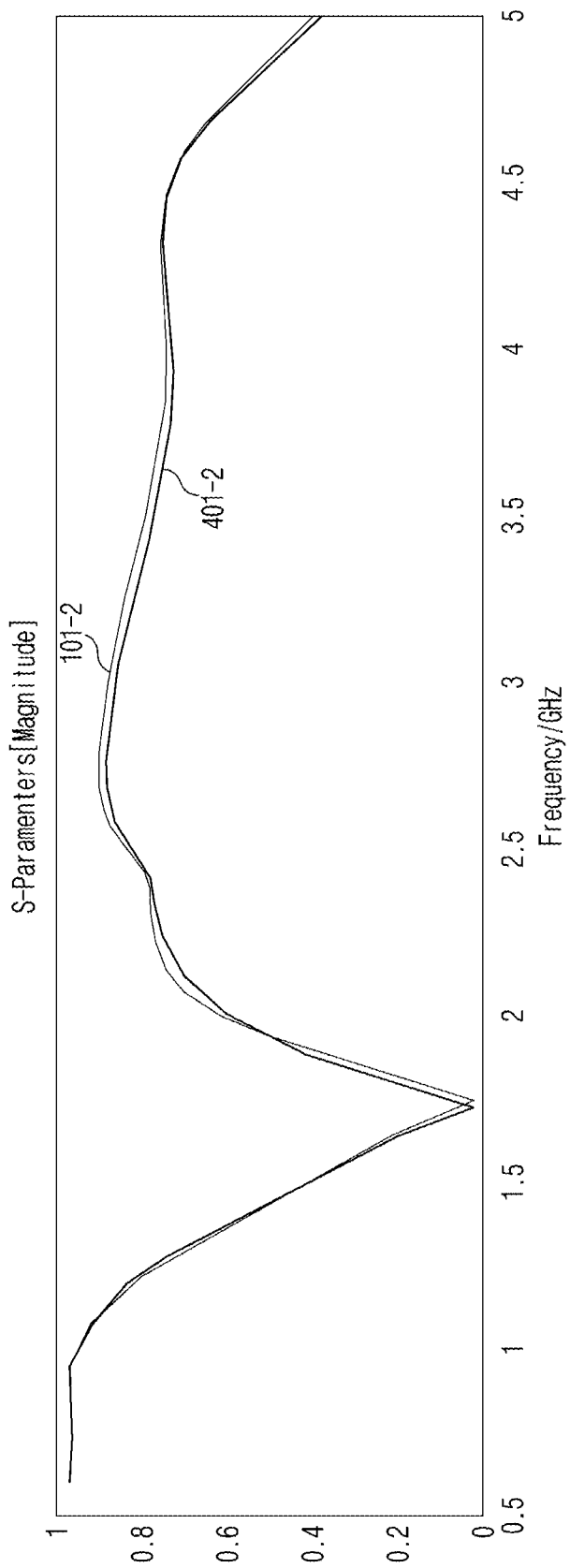
FIG. 6A is a graph illustrating an S-parameter of an electronic device according to an embodiment and an S-parameter of an electronic device according to a comparative example.

FIG. 6A is a graph illustrating an S-parameter of an electronic device according to an embodiment and an S-parameter of an electronic device according to a comparative example.

Figure 6B:
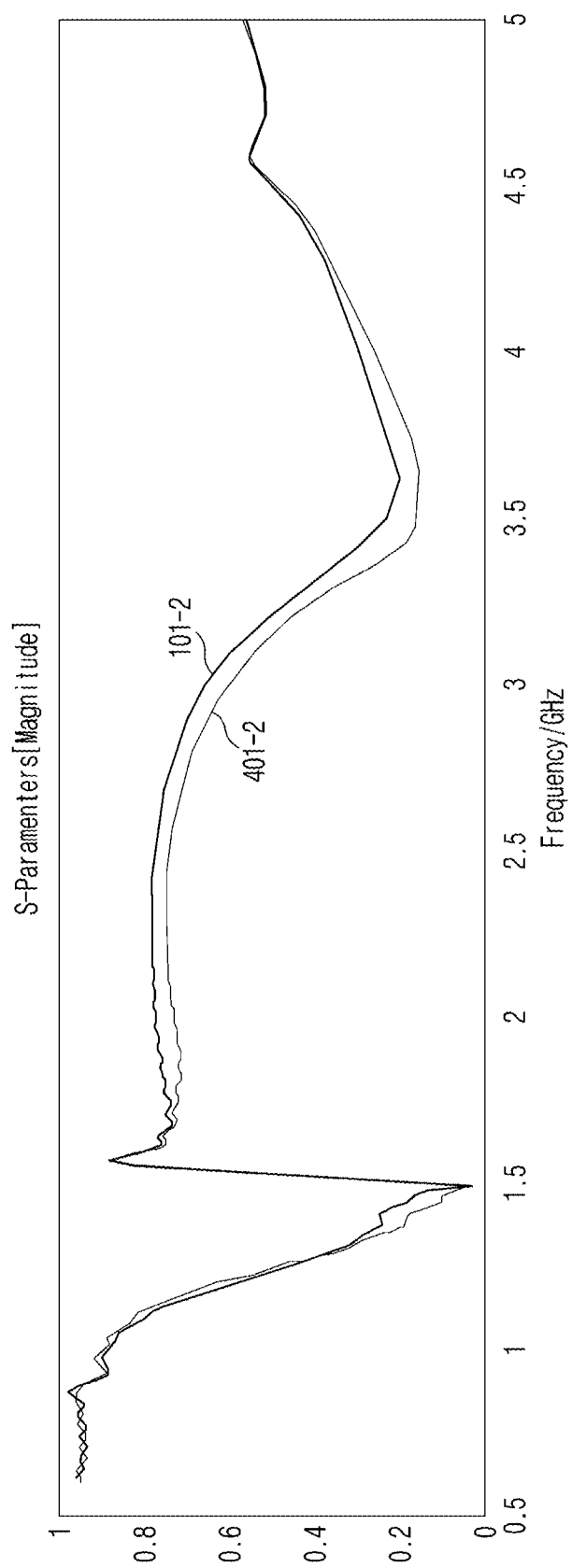
FIG. 6B is a graph illustrating an S-parameter of an electronic device according to an embodiment and an S-parameter of an electronic device according to a comparative example.

FIG. 6B is a graph illustrating an S-parameter of an electronic device according to an embodiment and an S-parameter of an electronic device according to a comparative example.

FIG. 6A represents a first S-parameter 101-2 (e.g., a ratio of voltages input/output through the first power feeding point F1) of the first antenna A1 in a second state of the electronic device 101 according to an embodiment.

FIG. 6B illustrates a first S-parameter 101-2 (e.g., a ratio of voltages input/output through the second power feeding point F2) of a second antenna A2, in the second state of the electronic device 101 according to an embodiment.

FIG. 6A illustrates a second S-parameter 401-2 (e.g., a ratio of voltages input/output through a fifth power feeding point F5) of a first conductive part 412, in the second state of the electronic device 401 according to the comparative example.

FIG. 6B illustrates a second S-parameter 401-2 (e.g., a ratio of voltages input/output through the sixth power feeding point F6) of a second conductive part 416, in the second state of the electronic device 401 according to a comparative example.

Referring to FIGS. 6A and 6B, in the second state, the first S-parameter characteristic 101-2 of the electronic device 101 according to an embodiment and the second S-parameter characteristic 401-2 of the electronic device 401 according to a comparative embodiment may be substantially the same or similar.

Figure 7A:
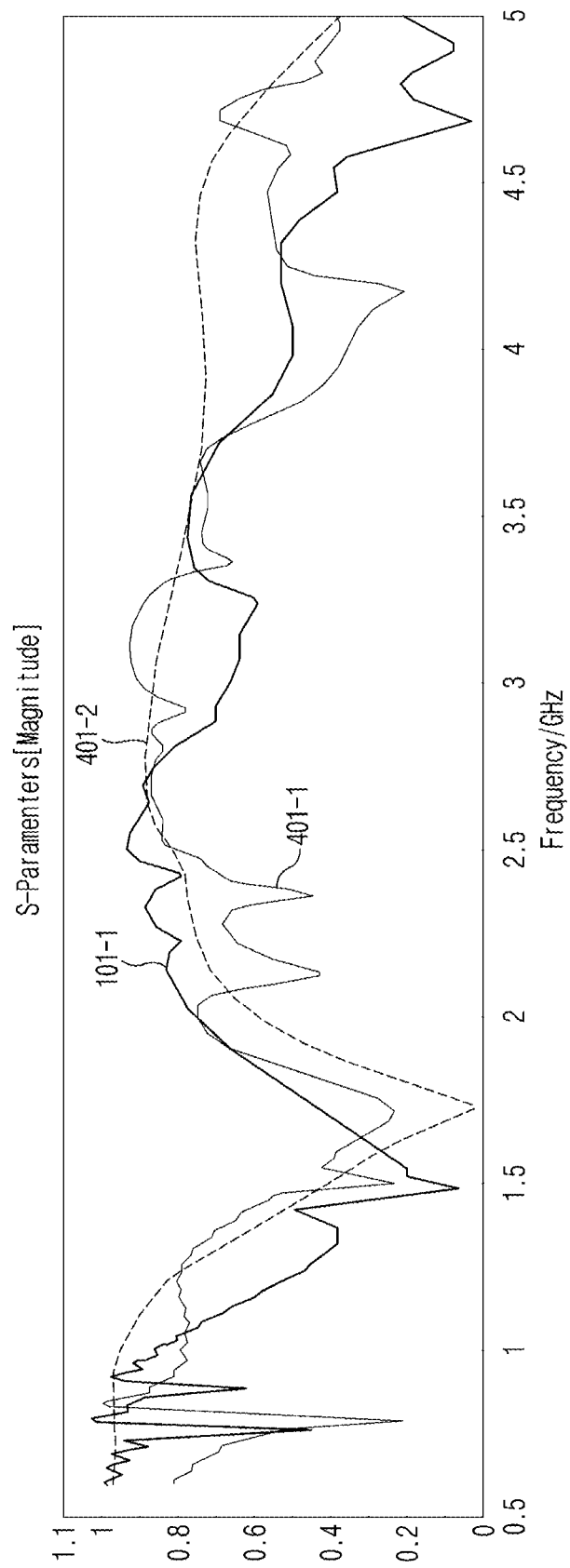
FIG. 7A is a graph illustrating an S-parameter of an electronic device according to an embodiment and an S-parameter of an electronic device according to a comparative example.

FIG. 7A is a graph illustrating an S-parameter of an electronic device according to an embodiment and an S-parameter of an electronic device according to a comparative example.

Figure 7B:
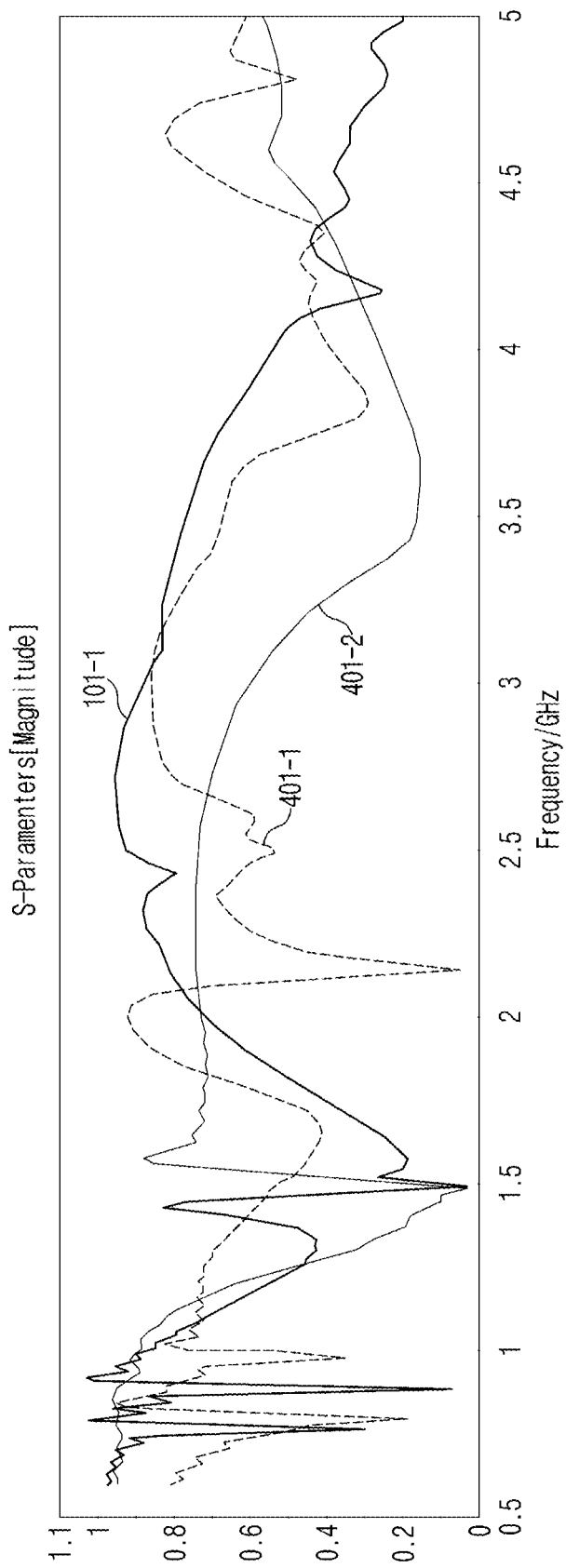
FIG. 7B is a graph illustrating an S-parameter of an electronic device according to an embodiment and an S-parameter of an electronic device according to a comparative example.

FIG. 7B is a graph illustrating an S-parameter of an electronic device according to an embodiment and an S-parameter of an electronic device according to a comparative example.

FIG. 7A illustrates a third S-parameter (e.g., a ratio between voltages input/output through the first power feeding point F1) of the fourth antenna A4 in the first state of the electronic device 101 according to an embodiment.

FIG. 7B illustrates a third S-parameter (e.g., a ratio of a voltage input/output through the second power feeding point F2) of the third antenna A3 in the first state of the electronic device 101 according to an embodiment.

FIG. 7A illustrates a fourth S-parameter 401-1 (e.g., a ratio between voltages input/output through the fifth power feeding point F5) of the first conductive part 412, in the first state of the electronic device 401 according to the comparative example.

FIG. 7B illustrates a fourth S-parameter 401-1 (e.g., a ratio between voltages input/output through the sixth power feeding point F6) of the second conductive part 416, in the first state of the electronic device 401 according to the comparative example.

FIG. 7A illustrates a second S-parameter 401-2 (e.g., a ratio of voltages input/output through the fifth power feeding point F5) of the first conductive part 412, in the second state of the electronic device 401 according to the comparative example.

FIG. 7B illustrates a second S-parameter 401-2 e.g., a ratio between voltages input/output through the fifth power feeding point F5) of the second conductive part 416, in the second state of the electronic device 401 according to the comparative example.

Referring to FIGS. 7A and 7B, according to an embodiment, the electronic device 101 may have a less shift degree of the resonance frequency when the electronic device 101 is changed from the second state to the first state, as compared to that the electronic device 401 according to the comparative example.

According to an embodiment, the electronic device 101 may have more excellent frequency selectivity in the first state, as compared to the electronic device 401 according to the comparative example.

Figure 8A:
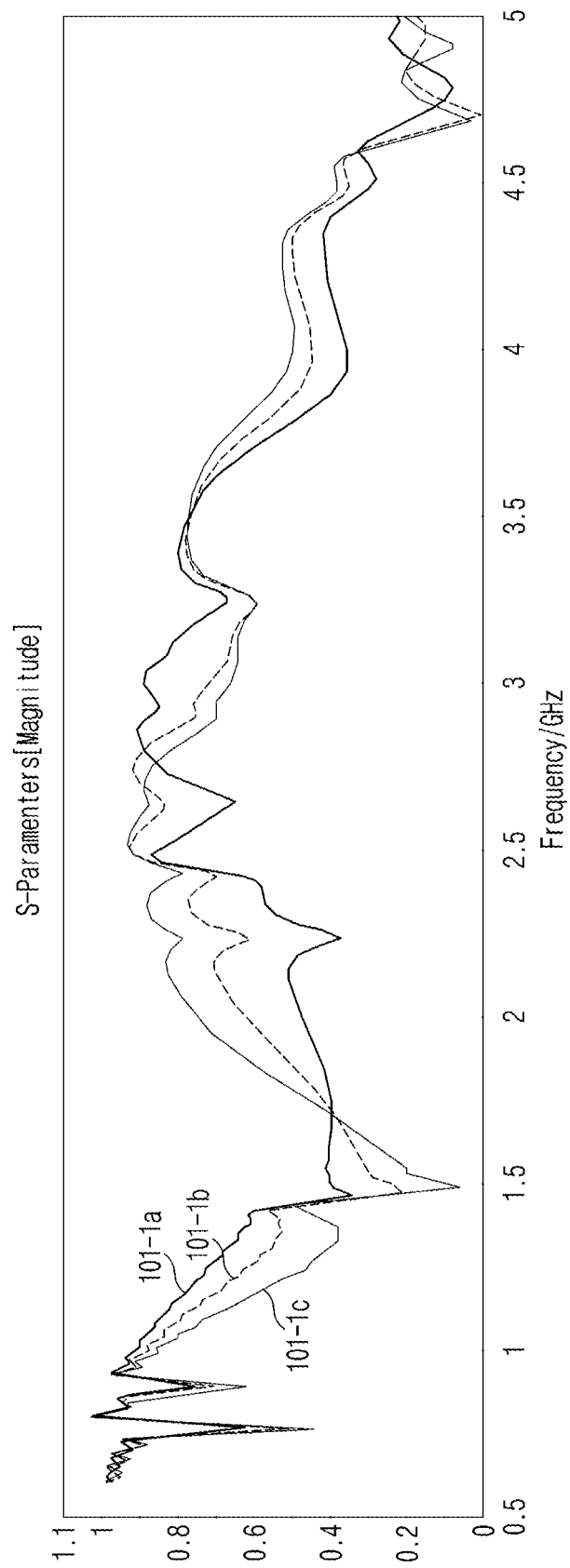
FIG. 8A is a graph illustrating an S-parameter of an electronic device in a first state based on a specified distance, according to an embodiment.

FIG. 8A is a graph illustrating an S-parameter of an electronic device in a first state based on a specified distance, according to an embodiment.

Figure 8B:
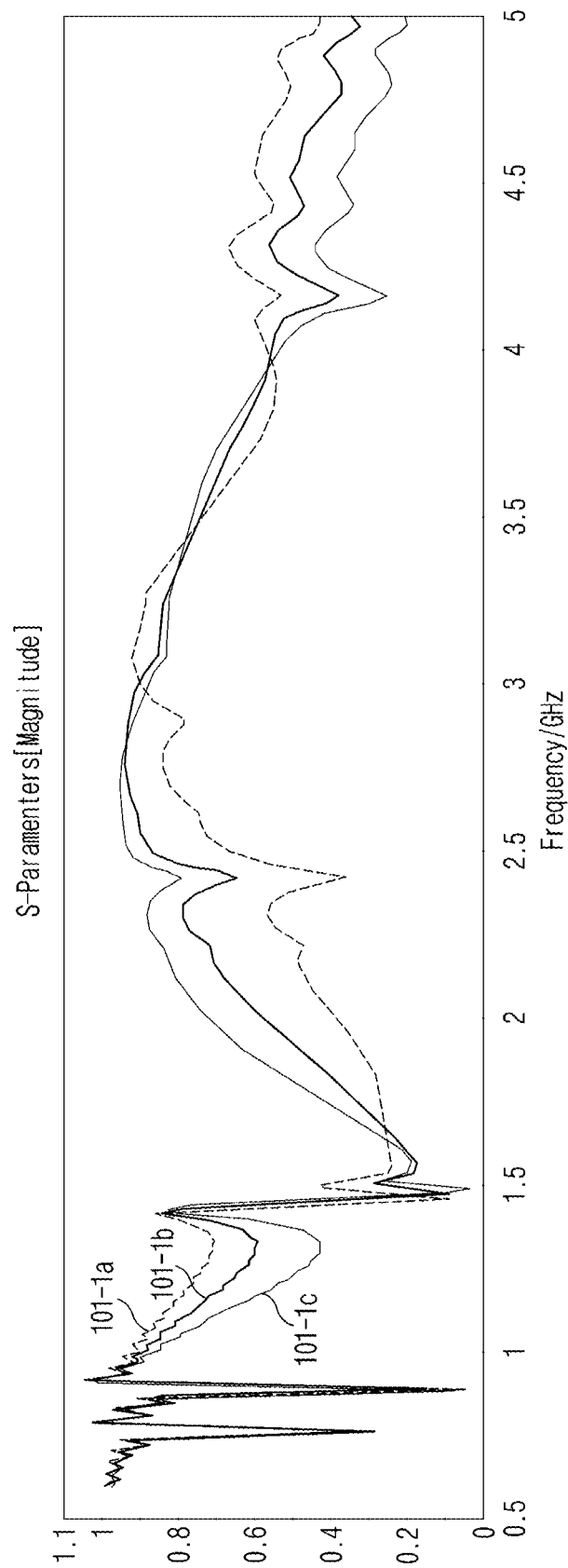
FIG. 8B is a graph illustrating an S-parameter of an electronic device in the first state based on a specified distance, according to an embodiment.

FIG. 8B is a graph illustrating an S-parameter of an electronic device in the first state based on a specified distance, according to an embodiment.

S-parameter 101-1a, S-parameter 101-1b, and S-parameter 101-1c of FIGS. 8A and 8B represent S-parameters when the specified distance D1 is a first distance, a second distance, or a third distance, in the first state of the electronic device 101 according to an embodiment. The third distance may be greater than the second distance, and the second distance may be greater than the first distance. For example, the third distance may be about 6 mm, the second distance may be about 3 mm, and the first distance may be about 1 mm, but the disclosure is not limited thereto Referring to FIGS. 8A and 8B, in the electronic device 101 according to an embodiment, the resonance frequency characteristic may be improved, as the specified distance D1 is increased in the first state. Therefore, according to an embodiment, in the first state of the electronic device, performance of the third antenna A3 and the fourth antenna A4 may be improved.

Figure 9:
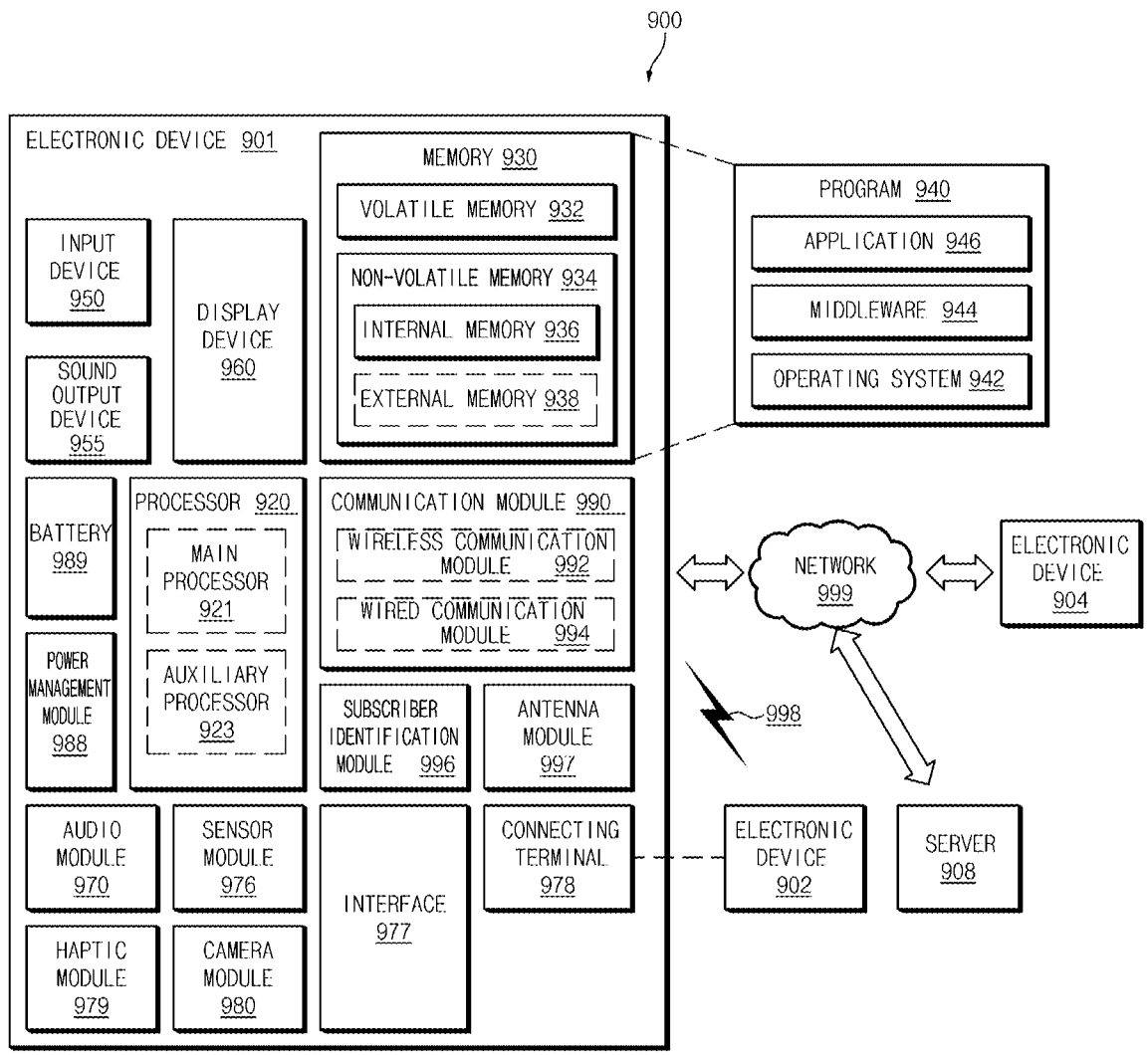
FIG. 9 is a block diagram illustrating an electronic device 901 under a network environment 900, according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

Figure 10:
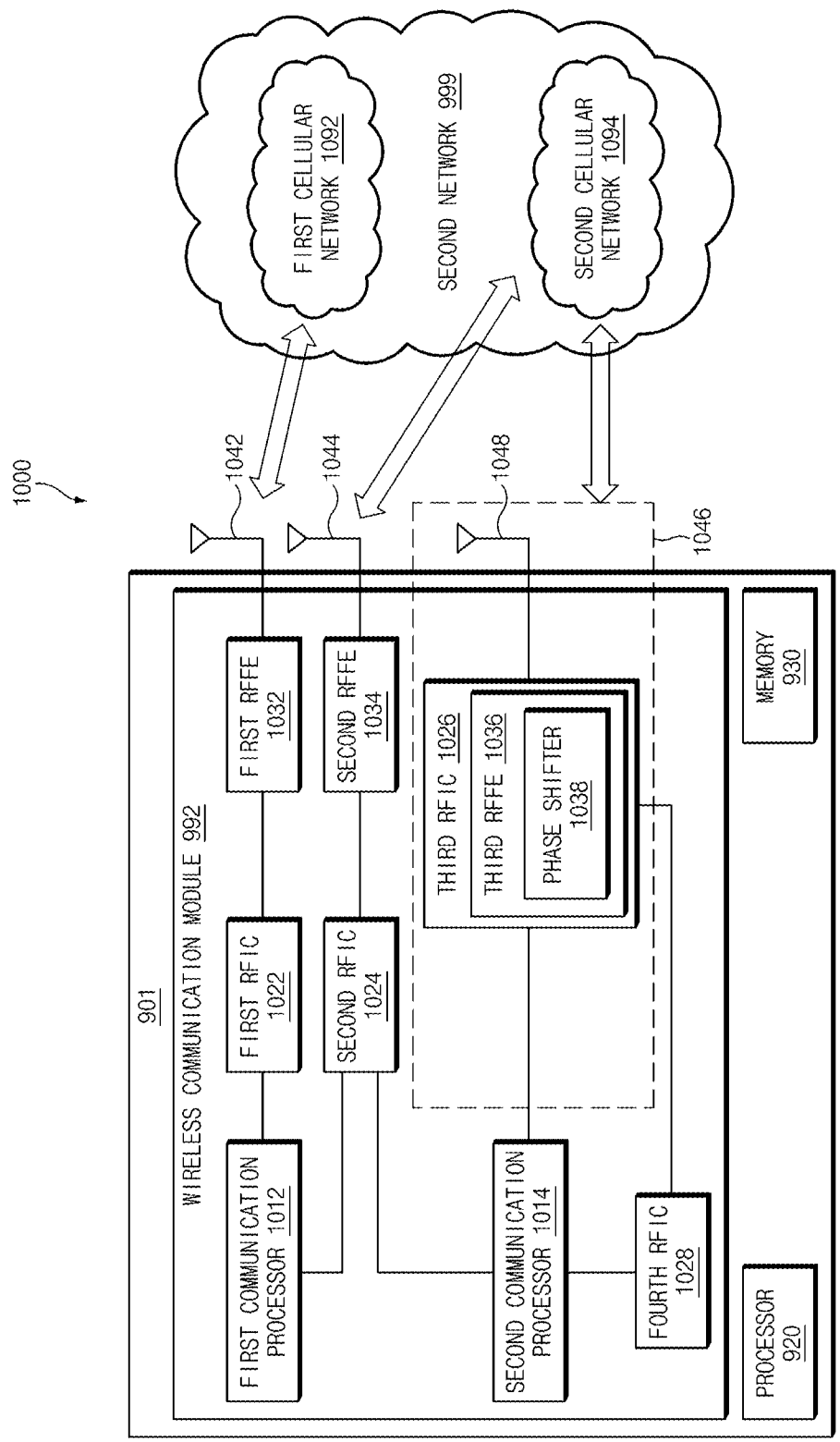
FIG. 10 is a block diagram 1000 of an electronic device 901 to support legacy network communication and 5G network communication, according to various embodiments.

FIG. 10 is a block diagram 1000 of an electronic device 901 for supporting legacy network communication and 5G network communication according to various embodiments.

Referring to FIG. 10, the electronic device 901 may include a first communication processor 1012, a second communication processor 1014, a first radio frequency integrated circuit (RFIC) 1022, a second RFIC 1024, a third RFIC 1026, a fourth RFIC 1028, a first radio frequency front end (RFFE) 1032, a second RFFE 1034, a first antenna module 1042, a second antenna module 1044, and an antenna 1048. The electronic device 901 may further include the processor 920 and the memory 930. The second network 999 may include a first cellular network 1092 and a second cellular network 1094. According to another embodiment, the electronic device 901 may further include at least one component of the components illustrated in FIG. 9, and the second network 999 may further include at least another network. According to an embodiment, the first communication processor 1012, the second communication processor 1014, the first RFIC 1022, the second RFIC 1024, the fourth RFIC 1028, the first RFFE 1032, and the second RFFE 1034 may form at least a part of the wireless communication module 992. According to another embodiment, the fourth RFIC 1028 may be omitted or may be included as a part of the third RFIC 1026.

The first communication processor 1012 may establish a communication channel for a band to be used for wireless communication with the first cellular network 1092 and may support legacy network communication through the established communication channel. According to various embodiments, the first cellular network 1092 may be a legacy network including a 2nd generation (2G), 3G, 4G, or long term evolution (LTE) network. The second communication processor 1014 may support establishment of a communication channel corresponding to a specified band (e.g., about 6 GHz to about 60 GHz) among bands to be used for wireless communication with the second cellular network 1094 and may support 5G network communication via the established communication channel. According to various embodiments, the second cellular network 1094 may be a 5G network defined in the 3GPP. Additionally, according to an embodiment, the first communication processor 1012 or the second communication processor 1014 may establish a communication channel for a specified band (e.g., about 6 GHz or lower) of the bands to be used for wireless communication with the second cellular network 1094 and may support 5G network communication through the established communication channel. According to an embodiment, the first communication processor 1012 and the second communication processor 1014 may be implemented in a single chip or a single package. According to various embodiments, the first communication processor 1012 or the second communication processor 1014 may be implemented in a single chip or a single package together with the processor 920, the auxiliary processor 923, or the communication module 990 of FIG. 9.

In the case of transmitting a signal, the first RFIC 1022 may convert a baseband signal generated by the first communication processor 1012 into a radio frequency (RF) signal of about 700 MHz to about 3 GHz that is used in the first cellular network 1092. In the case of receiving a signal, an RF signal may be obtained from the first cellular network 1092 (e.g., a legacy network) through an antenna (e.g., the first antenna module 1042) and may be pre-processed through an RFFE (e.g., the first RFFE 1032). The first RFIC 1022 may convert the pre-processed RF signal into a baseband signal so as to be processed by the first communication processor 1012.

In the case of transmitting a signal, the second RFIC 1024 may convert a baseband signal generated by the first communication processor 1012 or the second communication processor 1014 into an RF signal (hereinafter referred to as a "5G Sub6 RF signal") in a Sub6 band (e.g., about 6 GHz or lower) used in the second cellular network 1094 (e.g., a 5G network). In the case of receiving a signal, the 5G Sub6 RF signal may be obtained from the second cellular network 1094 (e.g., a 5G network) through an antenna (e.g., the second antenna module 1044) and may be preprocessed through an RFFE (e.g., the second RFFE 1034). The second RFIC 1024 may convert the pre-processed 5G Sub6 RF signal into a baseband signal so as to be processed by a corresponding communication processor of the first communication processor 1012 or the second communication processor 1014.

The third RFIC 1026 may convert a baseband signal generated by the second communication processor 1014 into an RF signal (hereinafter referred to as a "5G Above6 RF signal") in a 5G Above6 band (e.g., about 6 GHz to about 60 GHz) to be used in the second cellular network 1094 (e.g., a 5G network). In the case of receiving a signal, the 5G Above6 RF signal may be obtained from the second cellular network 1094 (e.g., a 5G network) through an antenna (e.g., the antenna 1048) and may be pre-processed through a third RFFE 1036. For example, the third RFFE 1036 may perform pre-processing of a signal by using a phase shifter 1038. The third RFIC 1026 may convert the pre-processed 5G Above6 RF signal into a baseband signal so as to be processed by the second communication processor 1014. According to an embodiment, the third RFFE 1036 may be implemented as a part of the third RFIC 1026.

According to an embodiment, the electronic device 901 may include the fourth RFIC 1028 independently of the third RFIC 1026 or as at least a part of the third RFIC 1026. In this case, the fourth RFIC 1028 may convert a baseband signal generated by the second communication processor 1014 into an RF signal (hereinafter referred to as an "intermediate frequency (IF) signal") in an intermediate frequency band (e.g., ranging from about 9 GHz to about 11 GHz) and may provide the IF signal to the third RFIC 1026. The third RFIC 1026 may convert the IF signal into the 5G Above6 RF signal. In the case of receiving a signal, the 5G Above6 RF signal may be received from the second cellular network 1094 (e.g., a 5G network) through an antenna (e.g., the antenna 1048) and may be converted into an IF signal by the third RFIC 1026. The fourth RFIC 1028 may convert the IF signal into a baseband signal so as to be processed by the second communication processor 1014.

According to an embodiment, the first RFIC 1022 and the second RFIC 1024 may be implemented with a part of a single package or a single chip. According to an embodiment, the first RFFE 1032 and the second RFFE 1034 may be implemented as a part of a single package or a single chip. According to an embodiment, at least one of the first antenna module 1042 or the second antenna module 1044 may be omitted or may be combined with any other antenna module to process RF signals in a plurality of bands.

According to an embodiment, the third RFIC 1026 and the antenna 1048 may be disposed at the same substrate to form a third antenna module 1046. For example, the wireless communication module 992 or the processor 920 may be disposed on a first substrate (e.g., a main PCB). In this case, the third RFIC 1026 may be disposed in a partial region (e.g., on a lower surface) of a second substrate (e.g., a sub PCB) independent of the first substrate, and the antenna 1048 may be disposed in another partial region (e.g., on an upper surface) of the second substrate. As such, the third antenna module 1046 may be formed. According to an embodiment, the antenna 1048 may include, for example, an antenna array to be used for beamforming. As the third RFIC 1026 and the antenna 1048 are disposed at the same substrate, it may be possible to decrease a length of a transmission line between the third RFIC 1026 and the antenna 1048. For example, the decrease in the transmission line may make it possible to prevent a signal in a high frequency band (e.g., about 6 GHz to about 60 GHz) used for the 5G network communication from being lost (or attenuated) due to the transmission line. As such, the electronic device 901 may improve the quality or speed of communication with the second cellular network 1094 (e.g., a 5G network).

The second cellular network 1094 (e.g., a 5G network) may be used independently of the first cellular network 1092 (e.g., a legacy network) (e.g., this scheme being called "stand-alone" (SA)) or may be used in a state of being connected with the first cellular network 1092 (e.g., this scheme being called "non-stand alone" (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 901 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 930 and may be accessed by another component (e.g., the processor 920, the first communication processor 1012, or the second communication processor 1014).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device (e.g., the memory 930).

At least a part of an apparatus (e.g., modules or functions thereof) or a method (e.g., operations) according to various embodiments may be, for example, implemented by instructions stored in a computer-readable storage media (e.g., the memory 930) in the form of a program module. The instruction, when executed by a processor (e.g., the processor 920), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an embedded memory. The instructions may contain a code made by a compiler or a code executable by an interpreter.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first housing including a first side housing including a first conductive part and a second conductive part spaced apart from the first conductive part;
   a second housing including a second side housing including a third conductive part and a fourth conductive part spaced apart from the third conductive part;
   a connection structure connected to the first housing and the second housing such that the first housing and the second housing are mutually folded or unfolded, wherein the electronic device includes a first state in which the first side housing contacts the second side housing at, and a second state, in which the first side housing and the second side housing are spaced apart from each other, the first conductive part overlaps the third conductive part in the first state, and the second conductive part overlaps the fourth conductive part in the first state;
   a first switch configured to selectively and electrically connect the first conductive part to the second conductive part;
   a second switch configured to selectively and electrically connect the third conductive part to the fourth conductive part;
   a first connection configured to electrically connect the first conductive part to the third conductive part in the first state;
   a second connection configured to electrically connect the second conductive part to the fourth conductive part in the first state; and
   a wireless communication circuit operatively connected to the first switch and the second switch, and electrically connected to a first point of the second conductive part and a second point of the third conductive part,
   wherein the wireless communication circuit is configured to transmit and receive a wireless communication signal having a specific band by feeding power to the first point or the second point.

2. The electronic device of claim 1, wherein, in the first state, the wireless communication circuit is configured to:
   control the first switch to electrically isolate the first conductive part from the second conductive part; and
   control the second switch to electrically isolate the third conductive part from the fourth conductive part.

3. The electronic device of claim 1, wherein, in the second state, the wireless communication circuit is configured to:
   control the first switch to electrically connect the first conductive part to the second conductive part; and
   control the second switch to electrically connect the third conductive part to the fourth conductive part.

4. The electronic device of claim 1, wherein, in the first state:
   the first conductive part and the third conductive part are spaced apart from each other by a specific distance, and
   the second conductive part and the fourth conductive part are spaced apart from each other by the specific distance.

5. The electronic device of claim 1, wherein:
the first housing includes:
- a first split part interposed between an end of the first conductive part and an end of the second conductive part, in the first side housing; and
- a second split part interposed between an end of the third conductive part and an end of the fourth conductive part, in the first side housing, the first conductive part and the second conductive part are spaced apart from each other while interposing the first split part between the first conductive part and the second conductive part, and the second conductive part and the fourth conductive part are spaced apart from each other while interposing the second split part between the second conductive part and the fourth conductive part.

6. The electronic device of claim 5, wherein, in the first state, the first split part overlaps the second split part.

7. The electronic device of claim 5, wherein the first housing includes:
- a fifth conductive part extending toward the connection structure from an end of the first side housing, wherein the fifth conductive part is electrically connected to the wireless communication circuit at a third point;
- a sixth conductive part extending toward the connection structure from an opposite end of the first side housing, wherein the sixth conductive part is electrically connected to the wireless communication circuit at a fourth point;
- a third split part interposed between an opposite end of the first conductive part and the fifth conductive part; and
- a fourth split part interposed between an opposite end of the second conductive part and the sixth conductive part.

8. The electronic device of claim 7, wherein the second housing includes:
- a seventh conductive part extending toward the connection structure from an end of the second side housing, wherein the seventh conductive part is electrically connected to the wireless communication circuit at a fifth point;
- an eighth conductive part extending toward the connection structure from an opposite end of the second side housing, wherein the eighth conductive part is electrically connected to the wireless communication circuit at a sixth point;
- a fifth split part interposed between an opposite end of the third conductive part and the seventh conductive part; and
- a sixth split part interposed between an opposite end of the fourth conductive part and the eighth conductive part.

9. The electronic device of claim 5, wherein:
the first point is closer to an opposite end of the second conductive part rather than the end of the second conductive part, and
the second point is closer to an opposite end of the third conductive part rather than the end of the third conductive part.

10. The electronic device of claim 9, wherein:
in the first state, the first connection is interposed between the end of the first conductive part and the end of the third conductive part, and
in the first state, the second connection is interposed between the end of the second conductive part and the end of the fourth conductive part.

11. The electronic device of claim 10, wherein:
the first connection includes:
- a first conductive magnet positioned at the first side housing and electrically connected to the first conductive part; and
- a second conductive magnet positioned at the second side housing, and electrically connected to the third conductive part, the first conductive magnet and the second conductive magnet make contact with each other such that mutually opposite poles face each other in the first state, the second connection includes:
- a third conductive magnet positioned at the first side housing and electrically connected to the second conductive part; and
- a fourth conductive magnet positioned at the second side housing and electrically connected to the fourth conductive part, and the third conductive magnet and the fourth conductive magnet make contact with each other such that mutually opposite poles face each other in the first state.

12. The electronic device of claim 9, wherein:
the second conductive part is electrically connected to at least one grounding part of the electronic device at a first grounding point, and
the third conductive part is electrically connected to the at least one grounding part at a second grounding point.

13. The electronic device of claim 12, wherein:
the first grounding point is interposed between the first point and the end of the second conductive part, and
the second grounding point is interposed between the second point and the end of the third conductive part.

14. The electronic device of claim 1, wherein the first conductive part, the second conductive part, the third conductive part, and the fourth conductive part are substantially parallel to the connection structure.

15. The electronic device of claim 1, wherein:
the first side housing includes a first non-conductive part disposed on the first conductive part and a second non-conductive part disposed on the second conductive part,
the second side housing includes a third non-conductive part disposed on the third conductive part and a fourth non-conductive part disposed on the fourth conductive part, and
in the first state:
- the first non-conductive part contacts the third non-conductive part,
- the second non-conductive part contacts the fourth non-conductive part, and
- the first conductive part and the third conductive part are spaced apart from each other while interposing the first non-conductive part and the third non-conductive part between the first conductive part and the third conductive part, and
the second conductive part and the fourth conductive part are spaced apart from each other while interposing the second non-conductive part and the fourth non-conductive part between the second conductive part and the fourth conductive part.

16. An electronic device comprising:
a first housing including a first side housing, wherein the first side housing of the first housing includes:
- a first conductive part extending in a first direction;
- a second conductive part spaced apart from the first conductive part and extending in the first direction; and a first split part interposed between an end of the first conductive part and an end of the second conductive part, a second housing including a second side housing, wherein the second side housing of the second housing includes:
  a third conductive part extending in the first direction;
  a fourth conductive part spaced apart from the third conductive part and extending in the first direction; and
  a second split part interposed between an end of the third conductive part and an end of the fourth conductive part;

a connection structure connected to the first housing and the second housing such that the first housing and the second housing are mutually folded or unfolded, wherein the electronic device includes a first state, in which the first side housing and the second side housing contact each other, and a second state, in which the first side housing and the second side housing are spaced apart from each other, the first conductive part is spaced apart from the third conductive part while overlapping the third conductive part in the first state, and the second conductive part is spaced apart from the fourth conductive part while overlapping the fourth conductive part in the first state;

a first switch configured to selectively and electrically connect the first conductive part to the second conductive part;

a second switch configured to selectively and electrically connect the third conductive part to the fourth conductive part;

a first connection configured to electrically connect the first conductive part to the third conductive part in the first state;

a second connection configured to electrically connect the second conductive part to the fourth conductive part, in the first state; and a wireless communication circuit operatively connected to the first switch and the second switch, and electrically connected to a first point of the second conductive part and a second point of the third conductive part, wherein the wireless communication circuit is configured to transmit and receive a wireless communication signal having a specific band by feeding power to the first point or the second point.

17. The electronic device of claim 16, wherein:
in the first state, the wireless communication circuit is configured to;
  control the first switch to electrically isolate the first conductive part from the second conductive part; and
  control the second switch to electrically isolate the third conductive part from the fourth conductive part, and
in the second state, the wireless communication circuit is configured to:
  control the first switch to electrically connect the first conductive part to the second conductive part; and
  control the second switch to electrically connect the third conductive part to the fourth conductive part.

18. The electronic device of claim 16, wherein:
the second conductive part is electrically connected to at least one grounding part of the electronic device at a first grounding point, and
the third conductive part is electrically connected to the at least one grounding part at a second grounding point.

19. The electronic device of claim 18, wherein:
the first grounding point is interposed between the first point and the end of the second conductive part, and
the second grounding point is interposed between the second point and the end of the third conductive part.

20. The electronic device of claim 19, wherein:
the first point is closer to an opposite end of the second conductive part, rather than the end of the second conductive part, and
the second point is closer to an opposite end of the third conductive part, rather than the end of the third conductive part.

* * * * *